(12) United States Patent
Tulloch et al.

(10) Patent No.: US 10,000,970 B2
(45) Date of Patent: Jun. 19, 2018

(54) DOWNHOLE DRILLING ASSEMBLY WITH MOTOR POWERED HAMMER AND METHOD OF USING SAME

(71) Applicant: National Oilwell DHT, L.P., Houston, TX (US)

(72) Inventors: Rory McCrae Tulloch, Aberdeen (GB); Alan Martyn Eddison, York (GB); Alastair Henry Walter Macfarlane, Angus (GB)

(73) Assignee: NATIONAL OILWELL DHT, L.P., Houston, TX (US)

( * ) Notice: Subject to any disclaimer, the term of this patent is extended or adjusted under 35 U.S.C. 154(b) by 343 days.

(21) Appl. No.: 14/650,100

(22) PCT Filed: Dec. 6, 2013

(86) PCT No.: PCT/US2013/073619
§ 371 (c)(1),
(2) Date: Jun. 5, 2015

(87) PCT Pub. No.: WO2014/089457
PCT Pub. Date: Jun. 12, 2014

(65) Prior Publication Data
US 2015/0315846 A1    Nov. 5, 2015

Related U.S. Application Data

(60) Provisional application No. 61/734,853, filed on Dec. 7, 2012.

(51) Int. Cl.
*E21B 4/14*        (2006.01)
*E21B 1/02*        (2006.01)
(Continued)

(52) U.S. Cl.
CPC ...... *E21B 4/14* (2013.01); *C08L 9/02* (2013.01); *C09J 183/04* (2013.01); *E21B 1/02* (2013.01);
(Continued)

(58) Field of Classification Search
CPC .............. E21B 4/14; E21B 1/02; E21B 4/10
(Continued)

(56) References Cited

U.S. PATENT DOCUMENTS 2,228,482 A    1/1941   Prebensen
2,694,551 A   11/1954   Snyder
(Continued)

OTHER PUBLICATIONS

Canadian Patent Application No. 2,894,163 Office Action dated May 11, 2016 (4 pages).
(Continued)

*Primary Examiner* — Taras P Bemko
(74) *Attorney, Agent, or Firm* — Conley Rose, P.C.

(57) ABSTRACT

A drilling assembly assembly includes a hammer motor, a shaft, a driver, and a hammer (218). The shaft is operatively connectable to the hammer motor and rotated thereby. The driver is operatively connectable to the shaft, and includes a cam (such as guide channel 232) rotatable with the shaft and a fixed guide (such as guide pins 230) having a guide surface thereon. The cam is engageable with the guide surface and axially movable thereabout during rotation thereof. The hammer is operatively connectable to the driver and axially movable therewith, axially movable within the housing (215) independently from axial movement of the housing, and engageable with the bit to impart an impact thereto whereby the bit is hammered.

30 Claims, 27 Drawing Sheets

(51) Int. Cl.
*E21B 4/00* (2006.01)
*E21B 4/20* (2006.01)
*C09J 183/04* (2006.01)
*E21B 4/10* (2006.01)
*C08L 9/02* (2006.01)

(52) U.S. Cl.
CPC .............. *E21B 4/003* (2013.01); *E21B 4/10* (2013.01); *E21B 4/20* (2013.01)

(58) Field of Classification Search
USPC .......................................................... 175/57
See application file for complete search history.

(56) References Cited

U.S. PATENT DOCUMENTS

| | | | |
|---|---|---|---|
| 4,127,368 A * | 11/1978 | Langer | F04C 2/084 228/173.6 |
| 5,135,059 A | 8/1992 | Turner et al. | |
| 6,431,294 B1 | 8/2002 | Eddison et al. | |
| 6,439,318 B1 | 8/2002 | Eddison et al. | |
| 6,761,231 B1 | 7/2004 | Dock et al. | |
| 7,419,018 B2 | 9/2008 | Hall et al. | |
| 7,461,706 B2 | 12/2008 | Eddison | |
| 8,167,051 B2 | 5/2012 | Eddison et al. | |
| 9,045,958 B2 | 6/2015 | Eddison | |
| 2002/0185312 A1 | 12/2002 | Armell et al. | |
| 2005/0134046 A1* | 6/2005 | Hoff | B60K 6/485 290/1 A |
| 2007/0181340 A1 | 8/2007 | Eddison | |
| 2011/0031020 A1 | 2/2011 | Cote | |
| 2011/0120725 A1* | 5/2011 | Downton | E21B 4/06 166/373 |
| 2012/0181042 A1* | 7/2012 | Ahmed | E21B 43/126 166/369 |
| 2013/0043022 A1 | 2/2013 | Forster | |
| 2015/0034387 A1 | 2/2015 | Malcolm et al. | |
| 2015/0176342 A1* | 6/2015 | Ficken | E21B 7/067 464/152 |

OTHER PUBLICATIONS

Canadian Patent Application No. 2,894,163 Office Action dated Feb. 7, 2017 (4 pages).
PCT/US2013/073619 International Search Report and Written Opinion dated Apr. 1, 2015, 14 pages.
PCT/US2013/073619 International Preliminary Report on Patentability dated Jun. 18, 2015, 11 pages.
Canadian Patent Application No. 2,894,163 Office Action dated Nov. 27, 2017 (3 pages).

* cited by examiner

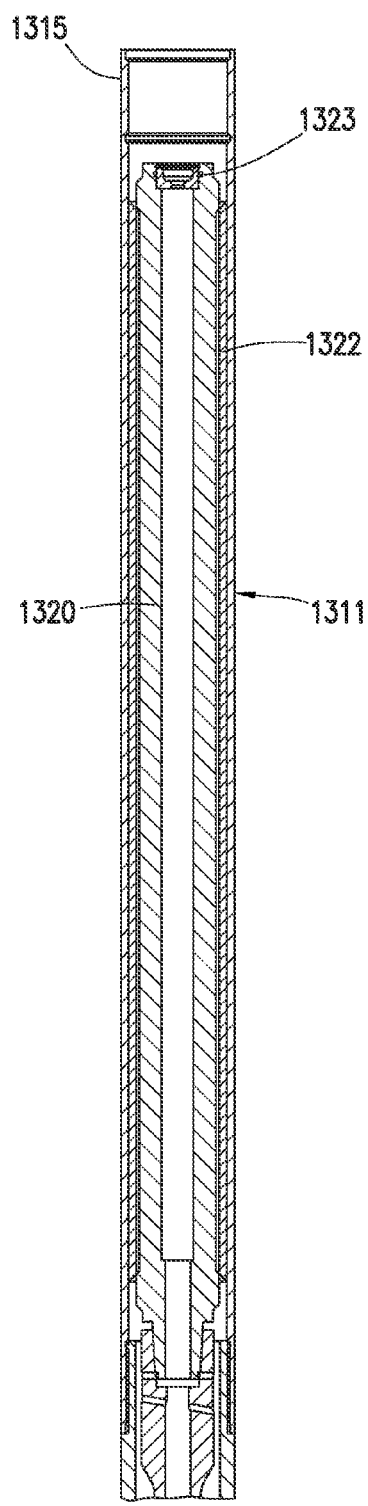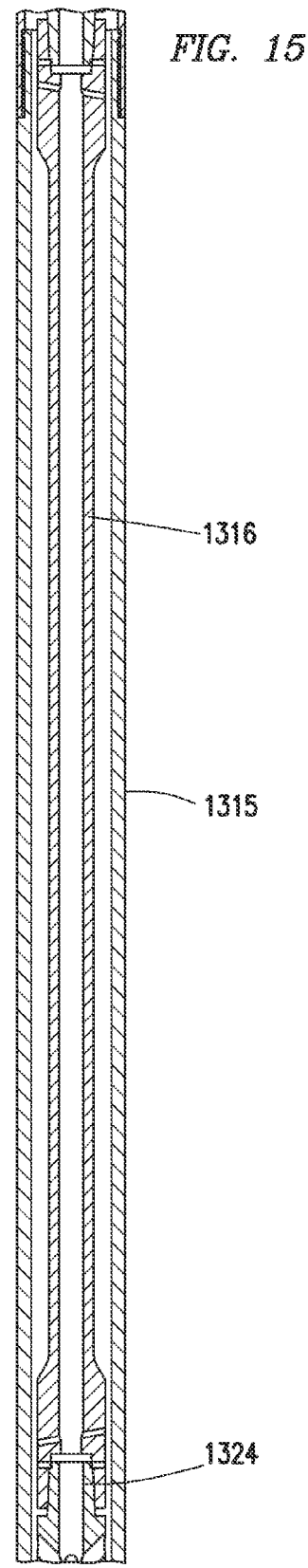
FIG. 14
FIG. 15

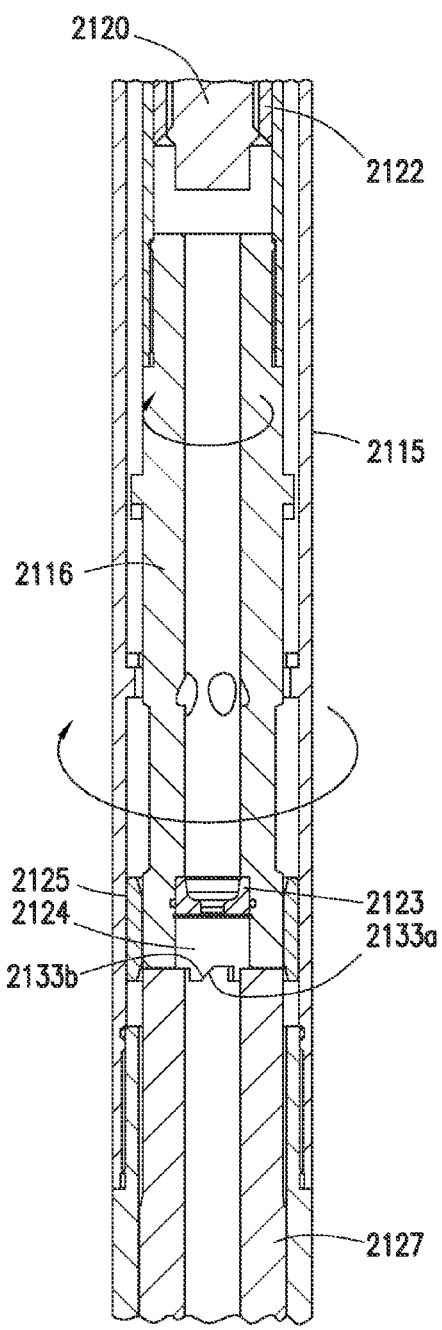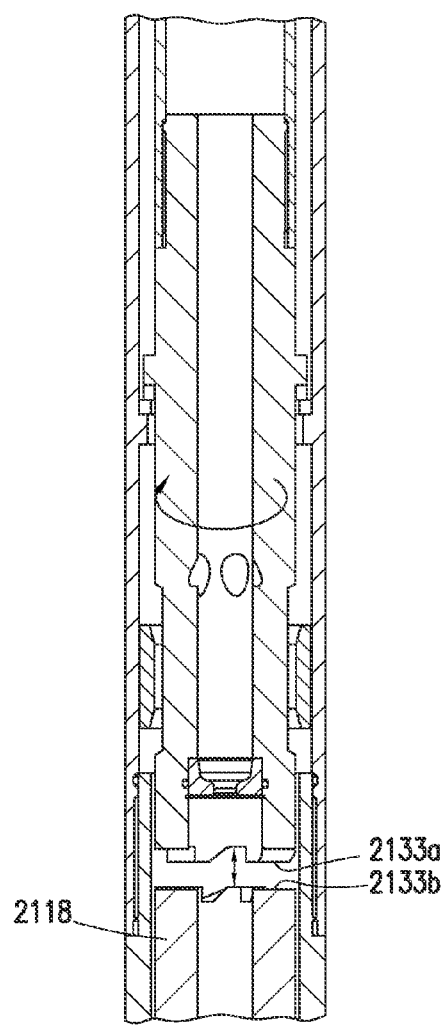
FIG. 22A
FIG. 22B

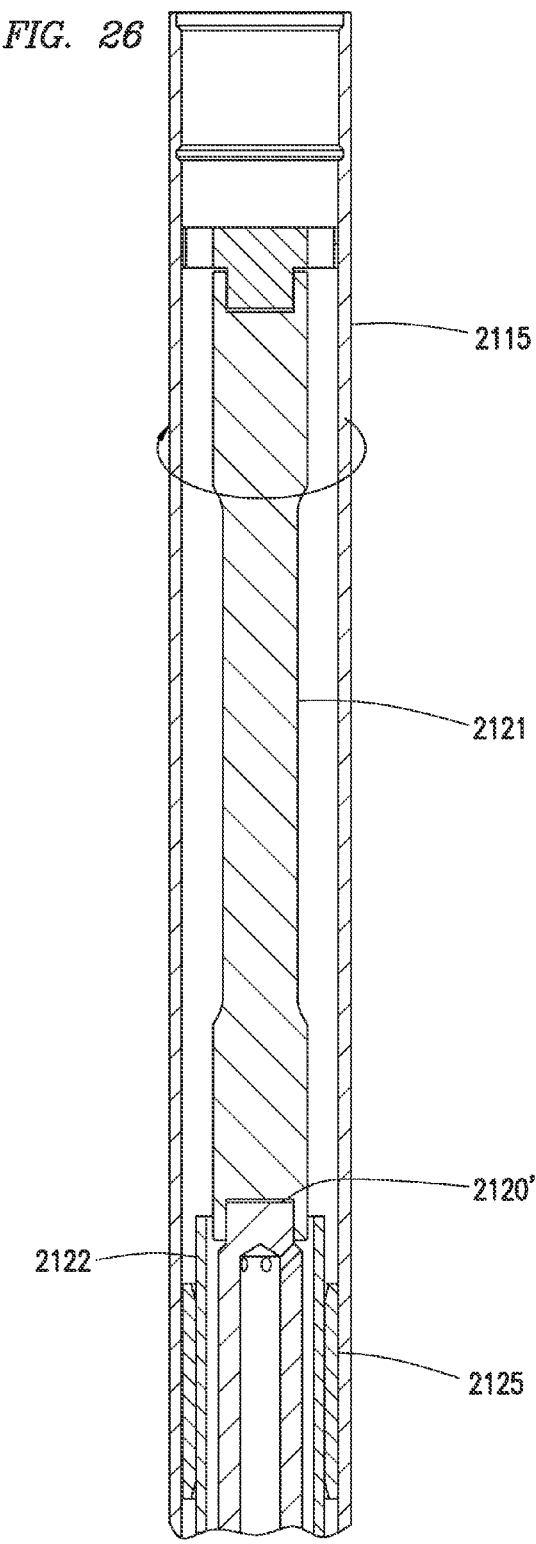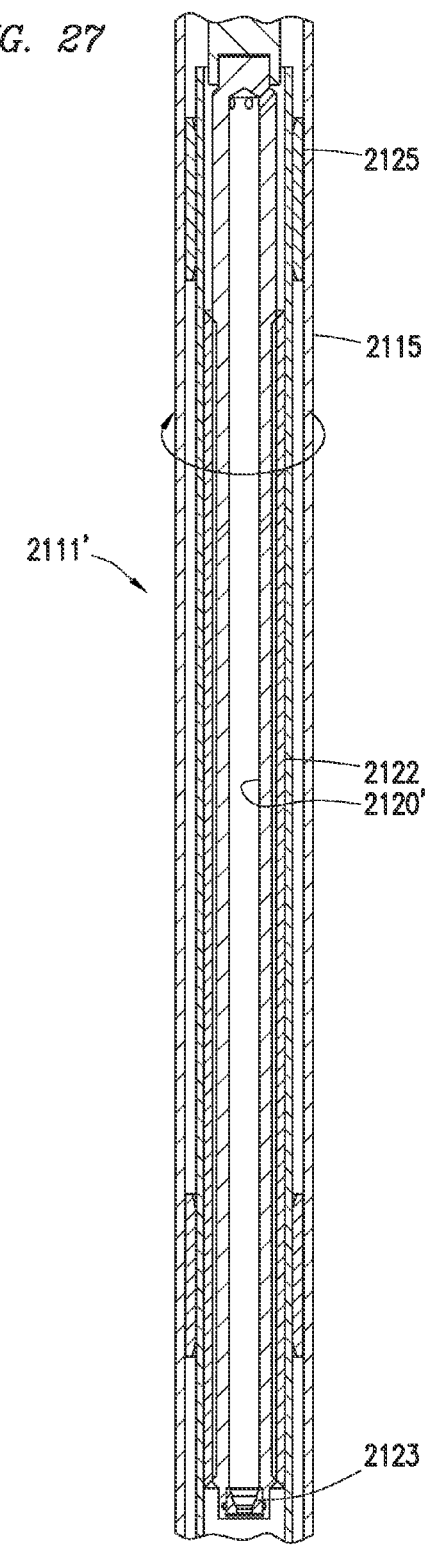

DOWNHOLE DRILLING ASSEMBLY WITH MOTOR POWERED HAMMER AND METHOD OF USING SAME

CROSS-REFERENCE TO RELATED APPLICATION

This application is a national phase application of PCT Application No. PCT/US2012/053004 which claims the benefit of to U.S. Provisional Application No. 61/734,853 filed on Dec. 7, 2012, the entire contents of which are hereby incorporated by reference.

BACKGROUND

This present disclosure relates generally to techniques for performing wellsite operations. More specifically, the present disclosure relates to techniques, such as hammers, for drilling wellbores.

Oilfield operations may be performed to locate and gather valuable downhole fluids. Oil rigs are positioned at wellsites, and downhole equipment, such as drilling tools, are deployed into the ground by a drill string to reach subsurface reservoirs. At the surface, an oil rig is provided to deploy stands of the pipe into the wellbore to form the drill string. Various surface equipment, such as a top drive, or a Kelly and a rotating table, may be used to apply torque to the stands of pipe, to threadedly connect the stands of pipe together, and to rotate the drill bit. A drill bit is mounted on the lower end of the drill string, and advanced into the earth by the surface equipment to form a wellbore.

The drill string may be provided with various downhole components, such as a bottom hole assembly (BHA), drilling motor, measurement while drilling, logging while drilling, telemetry and other downhole tools, to perform various downhole operations. The drilling motor may be provided to drive the drill bit and advance the drill bit into the earth. Examples of drilling motors are provided in U.S. Pat. Nos. 7,419,018, 7,461,706, 6,439,318, 6,431,294, 2007/0181340, and 2011/0031020.

SUMMARY

In at least one aspect, the disclosure relates to a drilling assembly of a downhole drilling tool for drilling a wellbore penetrating a subterranean formation. The downhole drilling tool is driven by surface equipment and includes a drill string, a bottom hole assembly, and a drill bit. The drilling assembly includes a hammer motor positionable about the bottom hole assembly and rotationally driven by fluid flow therethrough, a shaft operatively connectable to the hammer motor and rotatably thereby, a driver operatively connectable to the shaft, and a driver including a cam rotatable with the shaft and a fixed guide having a guide surface thereon. The cam is engageable with the guide surface and axially movable thereabout during rotation thereof. The hammer is operatively connectable to the driver and axially movable therewith, axially movable within the housing independently from axial movement of the housing, and engageable with the bit to impart an impact thereto whereby the bit is hammered.

The drilling assembly may include a nozzle positionable in the housing to selectively restrict flow of fluid therethrough. The hammer may have a passage therethrough, and the nozzle may be positionable about the passage to selectively restrict the flow therethrough whereby force is applied to the hammer. The hammer motor may include a helical stator with a helical rotor rotatable therein, a helical rotor with a helical stator rotatable therein, and/or joints, motor shafts, and/or bearings. The helical rotor may be solid, or hollow to permit fluid flow therethrough.

The drilling assembly may also include flow restrictors. The shaft may include a flexible shaft. The drilling assembly may also include an adapter operatively connecting the shaft to the driver. The driver or housing may have splines engageable with splines on the hammer or bit. The drilling assembly may also include bearings operatively connectable to the hammer.

The cam may include guide pins and the guide surface may have a guide channel. The guide pins may be slidably positionable in the guide channel. The cam may include a floating guide ring having a cam surface and the guide surface may include a fixed guide ring engageable. The fixed guide ring may have the guide surface thereon. The cam may be positioned about one an end of the hammer and wherein the guide surface is positioned about an end of the bit or a bit adapter.

The drilling assembly may also include a universal joint operatively connectable to the motor and the shaft. The hammer may include a shaft adapter operatively connectable to the shaft and a bit adapter operatively connectable to the bit. The cam surface may be positionable about the shaft adapter and the guide surface positionable about the bit adapter. The drilling assembly may include a housing having splines engageable with splines on the bit.

In another aspect, the disclosure relates to a drilling system for drilling a wellbore penetrating a subterranean formation. The drilling system includes a downhole tool and a drilling assembly. The downhole tool includes a bottom hole assembly, a drill string, and a drill bit deployable by a surface system. The drilling assembly includes a hammer motor positionable about the bottom hole assembly and rotationally driven by fluid flow therethrough, a shaft operatively connectable to the hammer motor and rotatably thereby, a driver operatively connectable to the shaft, and a hammer. The driver includes a cam rotatable with the shaft and a fixed guide having a guide surface thereon. The cam is engageable with the guide surface and axially movable thereabout during rotation thereof. The hammer is operatively connectable to the driver and axially movable therewith, axially movable within the housing independently from axial movement of the housing, and engageable with the bit to impart an impact thereto whereby the bit is hammered.

The drilling assembly may be rotationally driven by the surface system. The drilling system also includes a downhole motor. The drilling assembly may be rotationally driven by the downhole motor.

Finally, in another aspect, the disclosure relates to a method of drilling a wellbore penetrating a subterranean formation. The method involves deploying a downhole tool into the subterranean formation via a surface system. The downhole tool includes a bottom hole assembly, a drill string, and a drill bit. The method also involves rotating a drilling assembly including a hammer motor, a shaft operatively connectable to the hammer motor, a driver operatively connectable to the shaft, and a hammer. The driver includes a cam and a fixed guide having a guide surface thereon, and is operatively connectable to the driver and axially movable therewith. The method also involves rotating the cam with the shaft by passing a fluid through the hammer motor, and hammering the bit with the hammer by engaging the guide surface with the cam such that the cam is axially moved about the guide surface during the rotating and the hammer is axially moved within the housing independently from axial movement of the housing.

The method may also involve selectively increasing pressure in the drilling assembly by selectively restricting flow therethrough. The hammering may involve slidably positioning pins of the cam about a guide channel of the guide surface, and/or slidably engaging a cam surface of the cam along the guide surface. The method may also involve passing a portion of the fluid through a rotor of the hammer motor and/or applying force to drive the hammer by selectively restricting the flow of fluid through the hammer.

BRIEF DESCRIPTION OF THE DRAWINGS

So that the present disclosure can be understood in detail, a more particular description of the disclosure is illustrated in the appended drawings. It is to be noted, however, that the appended drawings illustrate only example embodiments and are, therefore, not to be considered limiting of its scope. The figures are not necessarily to scale and certain features, and certain views of the figures may be shown exaggerated in scale or in schematic in the interest of clarity and conciseness.

FIGS. 13-20 depict various views of a downhole drilling assembly with motor powered hammer with another bit cam.

FIGS. 21A-21B, 22A-22B, 23, and 24 depict various views of a downhole drilling assembly with motor powered hammer with a rotating stator and a non-rotating, solid rotor.

FIGS. 25A-25B, 26, 27, and 28 depict various views of a downhole drilling assembly with motor powered hammer with a rotating stator and a non-rotating, hollow rotor.

DETAILED DESCRIPTION OF THE INVENTION

The description that follows includes exemplary apparatus, methods, techniques, and/or instruction sequences that embody techniques of the present subject matter. However, it is understood that the described embodiments may be practiced without these specific details.

The present disclosure relates to downhole drilling assemblies with motor powered hammers and drill bits used in drilling wellbores. The drill bit may be rotated by rotation of the drill string from the surface or by a drill bit rotation drilling motor. A motor powered hammer may be used to generate rotational output that is converted to axial reciprocation, thereby providing a reciprocating action to hammer the drill bit. The reciprocating action of the hammer may move independently of a housing and independent of weight on bit that is applied to the housing.

The motor powered hammer may operate without requiring an oscillating type design using a variable orifice (e.g., valve block) to redirect and/or restrict flow. Flow rate of fluid flowing through the downhole drilling assembly may be configured to selectively adjust the operation of the drilling motors and/or rotation of the drill bit. Independent control of bit rotational speed and/or weight on bit from hammer impact speed may be provided with bit rotation by surface equipment (without requiring a second, bit rotation motor). Hydraulic motors may be used to increase speed, for example, by increasing flow rate. Independent control may also be provided by using a bit rotation motor that is electrically powered.

In given embodiments of these motor-powered hammer designs, the motor is used solely to provide rotational speed and torque to create axial reciprocation of a hammer mass. High hydraulic pressure drop through the hammer shaft nozzle can thus be used to create large downward hammer force over the available annular thrust area as the motor torque available may be used solely to pull the hammer shaft upwards with the hydraulic pressure pushing it downwards to create the impact on the bit. No torque from the hammer motor is used to drill the bit rotationally.

The hammer may be coupled to the motor (stator or rotor) and rotates in the hammer tool housing as a response of fluid flow in the motor. The hammer may have a cam surface to gradually lift the hammer as it rotates. The hammer may also reciprocate in the hammer tool housing (either the stator or the rotor also reciprocates, or there is a splined connection between the motor and the hammer). The hammer may have a flow passage restricted by a nozzle to provide a controllable down thrust force. The hammer may impact the bit (directly or indirectly). Rotation between the bit and the hammer tool housing may be prevented (by a threaded connection or a splined connection).

Figure 1:
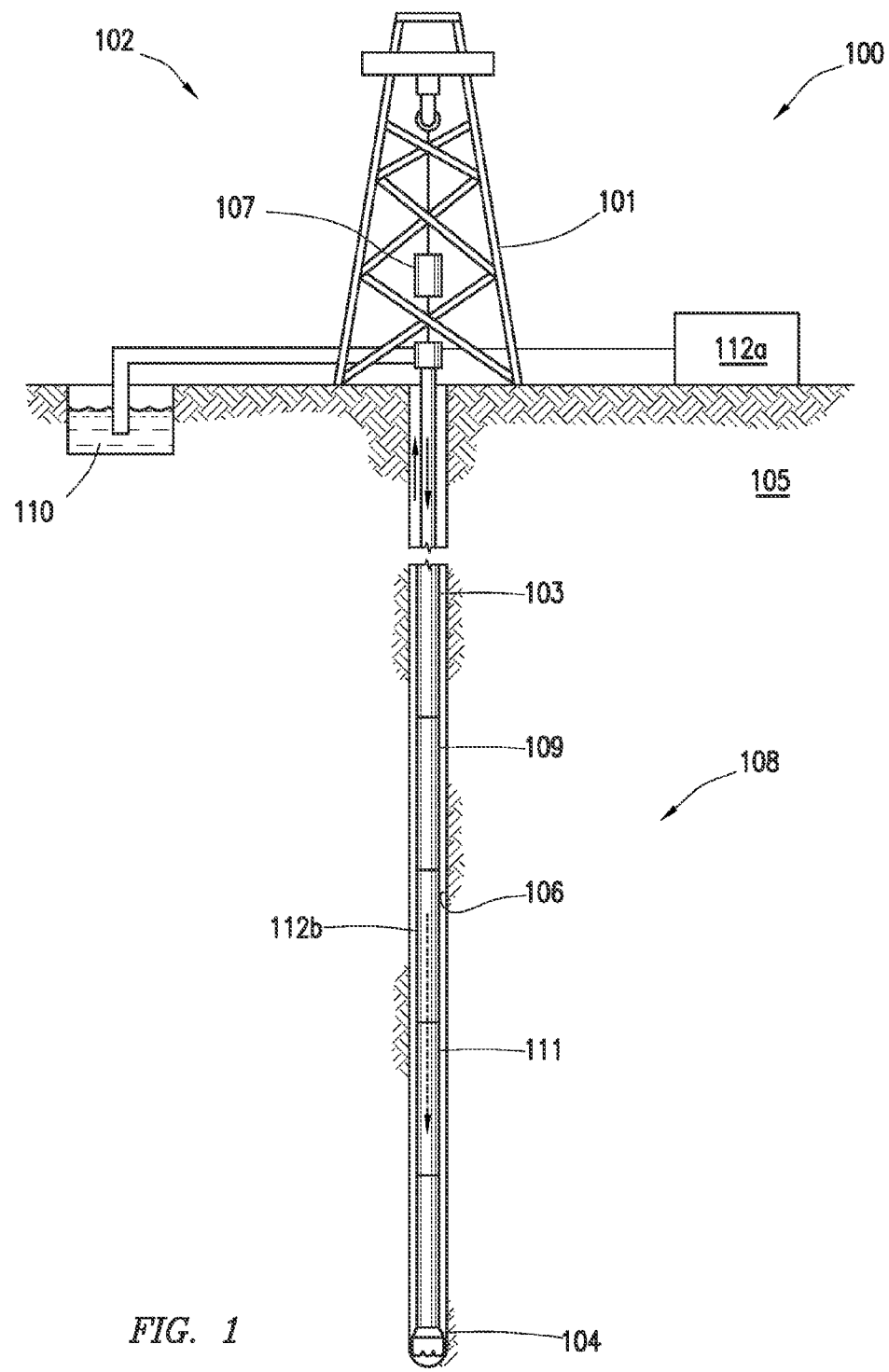
FIG. 1 depicts schematic views, partially in cross-section, of a wellsite having a surface system and a downhole drilling system for drilling a wellbore, the downhole drilling system having a downhole drilling assembly with a motor powered hammer.

FIG. 1 depicts an example environment in which a downhole drilling assembly may be used. While a land-based drilling rig with a specific configuration is depicted, the drilling assembly herein may be usable with a variety of land based or offshore applications. In each version, a drilling system 100 includes a rig 101 positionable at a wellsite 102 for performing various wellbore operations, such as drilling. The drilling system 100 may have a steerable assembly, or a straight-hole hammer drilling assembly that is not steerable. The drilling system 100 may be used, for example, with coil tubing applications with two motors.

FIG. 1 depicts a schematic view, partially in cross-section, of the wellsite 102. The drilling system 100 also includes a drill string 103 with a bottom hole assembly (BHA) 108 and a drill bit 104 at an end thereof. The drill string 103 may include drill pipe, drill collars, coiled tubing or other tubing used in drilling operations. The drill bit 104 is advanced into a subterranean formation 105 to form a wellbore 106. The bit 104 may be, for example, a roller cone or polycrystalline diamond cutter (PDC) bit.

Various surface (or rig) equipment 107, such as a Kelly, rotary table, top drive, elevator, etc., may be provided at the rig 101 to rotate the drill bit 104. A surface controller 112a is also provided at the surface to operate the drilling system. Downhole equipment, such as the BHA 108, is deployed from the surface equipment and into the wellbore 106 by the drill string 103 to perform downhole operations.

The BHA 108 is at a lower end of the drill string 103 and contains various downhole equipment for performing downhole operations. Such equipment may include, for example, measurement while drilling, logging while drilling, telemetry, processors and/or other downhole tools. As shown, the BHA 108 includes a downhole controller 112b for communication between the BHA 108 and the surface controller 112*a*. One or more controllers 112*a,b* may be provided. The BHA 108 may also be provided with various motors (e.g., one or two motors) for operating downhole equipment, such as the drill bit 104.

The BHA 108 may have a motor powered hammer 111 for hammering the drill bit 104. The motor powered hammer 111 is positioned between the drill string 103 and the drill bit 104. The motor powered hammer 111 may be positioned, for example, adjacent or as part of the BHA 108. Optionally, the BHA 108 may also include a drill bit drill bit rotation motor 109 that may be used to rotationally drive the drill bit. As shown, the drill bit rotation motor 109 may be located uphole from the motor powered hammer 111. The drill bit rotation motor 109 and/or the rig equipment 107 may be used to rotate the bit 104. For example, the drill bit 104 may be driven from the surface equipment (e.g., top drive or rotary table at the surface) or from the drill bit rotation motor 109 that drives the motor powered hammer 111, with the stator of the motor powered hammer 111 screwed into the bit box of the drill bit rotation motor 109 above it.

The motor powered hammer 111 may include, for example, an electric, vane, turbodrill, moineau or other motor for connection to and/or to hammer the drill bit 104. An example of a moineau motor that may be usable is provided in U.S. Pat. No. 7,419,018. In some cases, the motor powered hammer 111 may include a designed motor using, for example, helical rotor and stator combinations. The motor powered hammer 111 may be, for example, about a 4.75 inch (12.06 cm) motor with about 250 to about 300 gpm (about 946.35 to about 1135.6 l/min) through its helical profile. The drill bit rotation motor 109 may be, for example, an electric, vane, turbo drill, moineau or other motor capable of providing rotation to the bit.

A mud pit 110 may be provided at the surface for passing mud through the drill string 103, the BHA 108 and out the bit 104 as indicated by the arrows. The drill bit rotation motor 109 and the motor powered hammer 111 may be activated by fluid flow from the mud pit 110 and through the drill string 103. Flow of drilling mud from pit 110 may be used to activate the drilling motors during drilling, for example by rotationally driving the motors or other downhole components.

The rotational speed of the bit 104 may be selectively varied as desired, for example, using the surface rig equipment 107, or with, for example, an electric drill bit rotation motor 109. For example, rotation of the surface rig equipment 107 can be varied to drive the bit, while fluid flow through the BHA 108 may be used to vary the reciprocation speed of the motor powered hammer 111. When, for example, a hydraulic drill bit rotation motor 109 is used, the rotational speed of the bit may also be varied by flow therethrough. The flow through the BHA 108 may vary both the rotational speed of the bit using the drill bit rotation motor 109 and speed of the motor powered hammer 111. The motor powered hammer 111 may be operated independently of, or cooperatively with, other equipment, such as the drill bit rotation motor 109.

Figure 5:
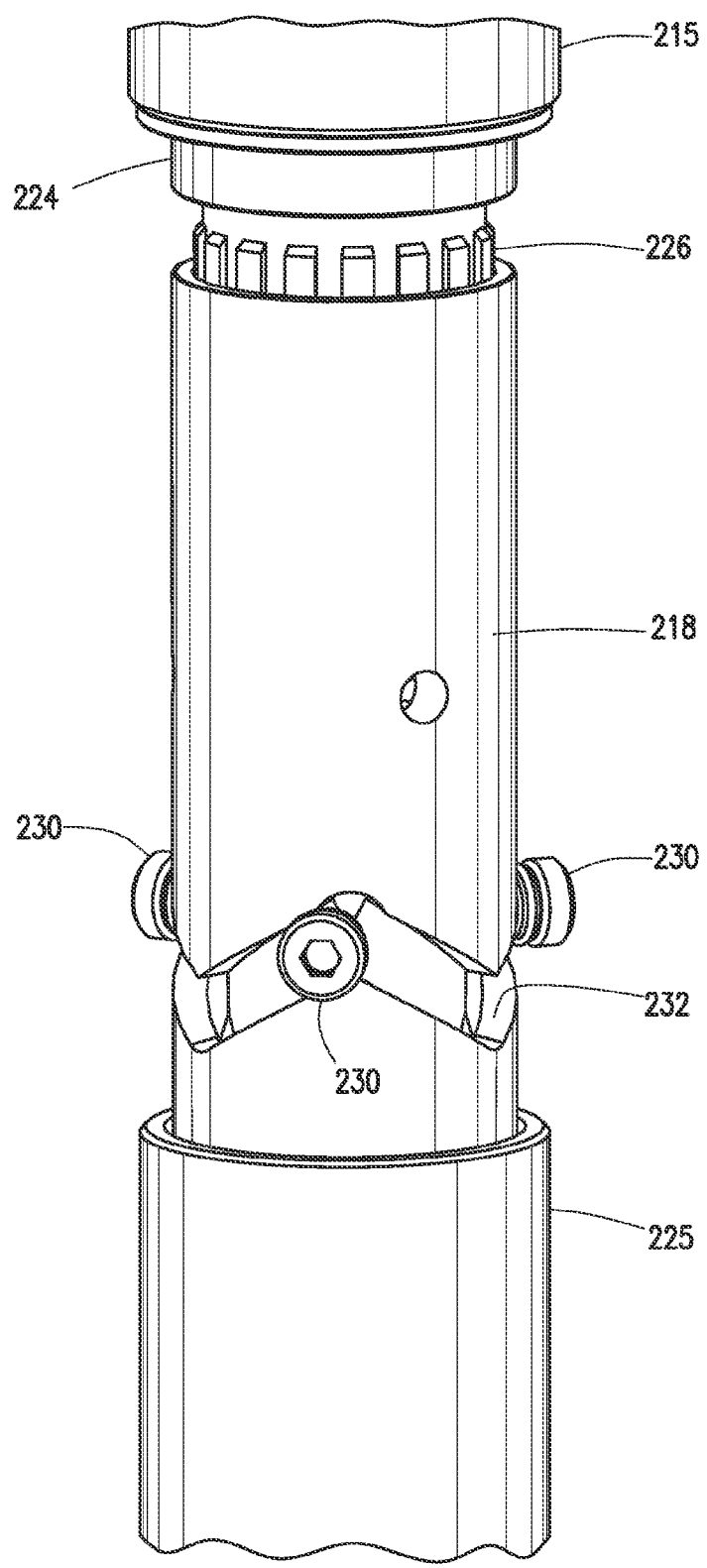
Figure 6:
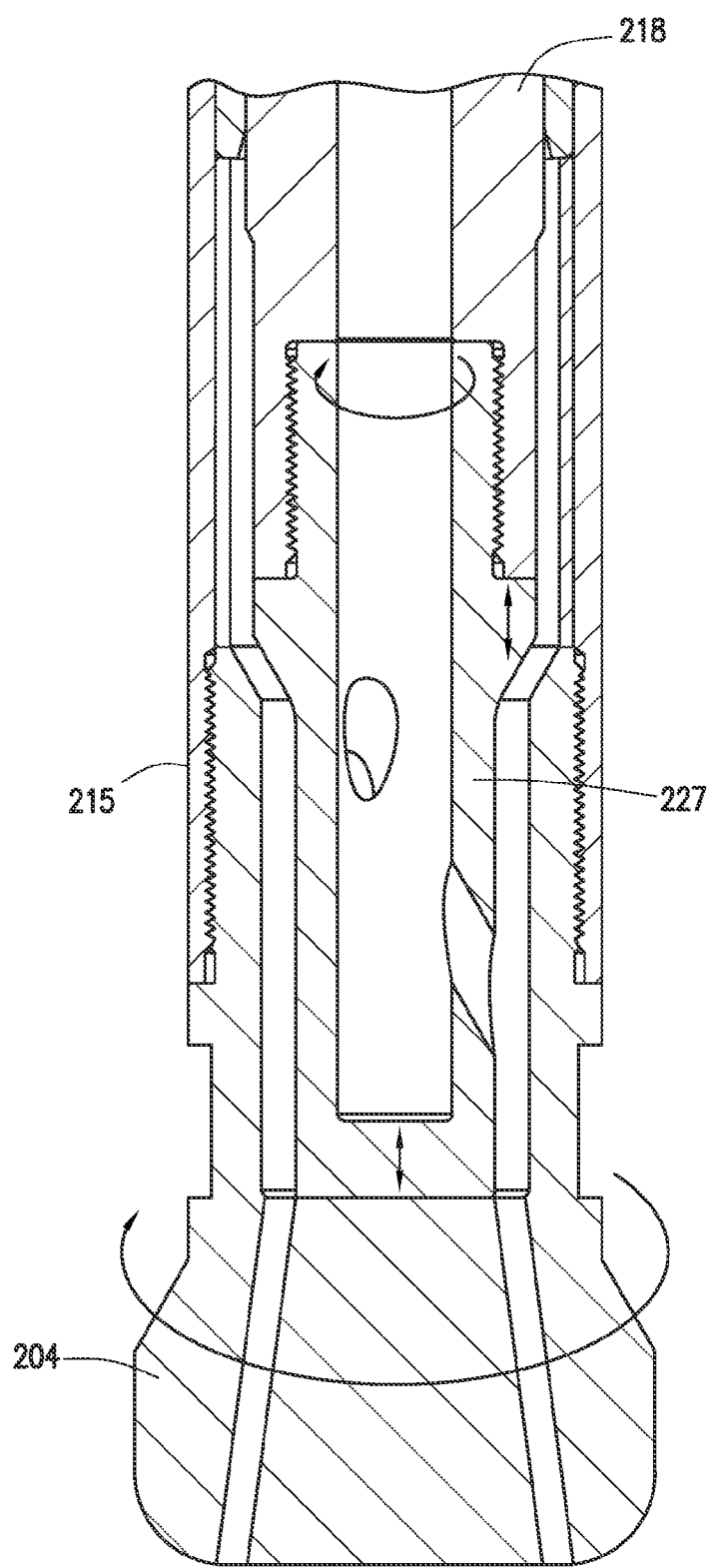
Figure 7:
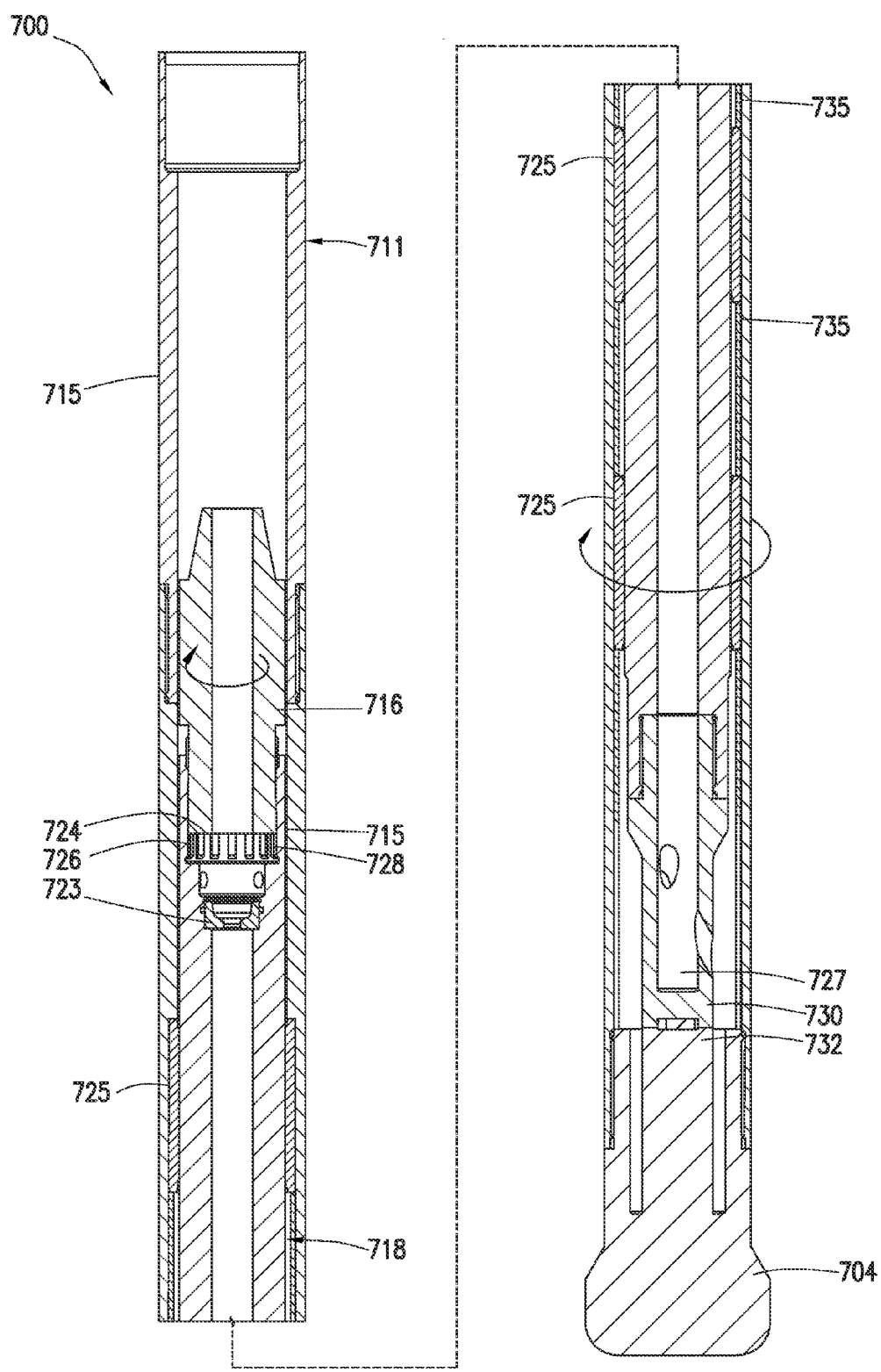
FIGS. 7-8 depict various views of a downhole drilling assembly with motor powered hammer with wave profile cam.
Figure 8:
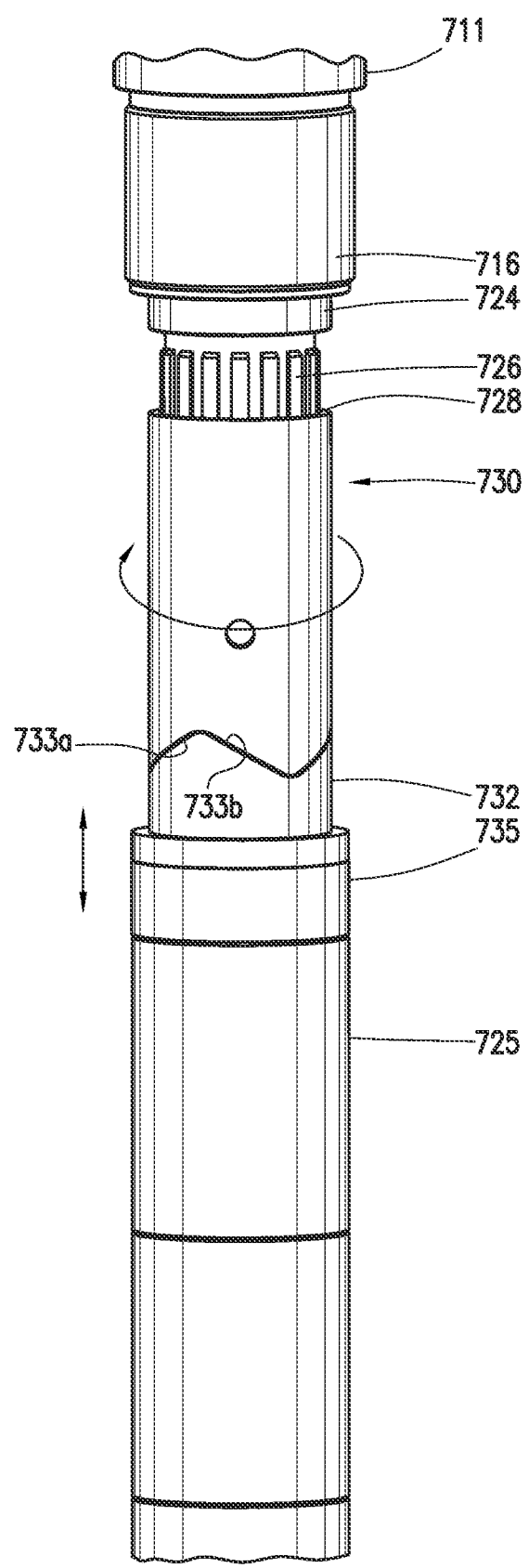

FIGS. 2A-8 depict various views of a downhole drilling assembly with a motor powered hammer reciprocated by a rotationally driven splined driver. FIGS. 2A-6 depict a first version of the motor powered hammer with a guide pin configuration. FIGS. 7 and 8 depict a second version of the motor powered hammer with a cam configuration. These configurations may be formed, for example, from a standard drilling motor provided with a bearing casing having an additional external pin thread, a reduced diameter bit box on the output shaft, and a special output shaft adapter with a splined connection.

Figure 2A:
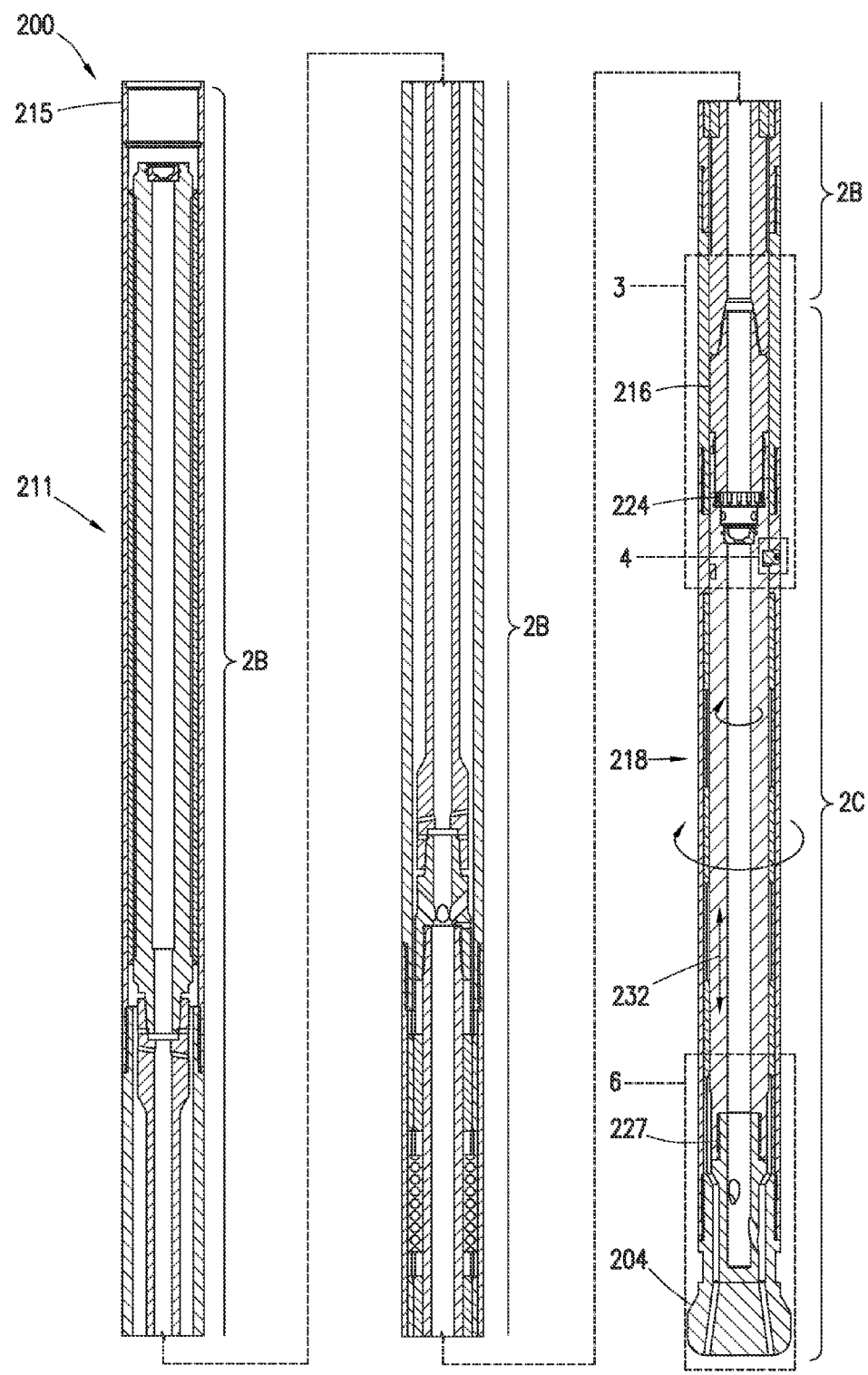
FIGS. 2A-2C, 3, 4A-4B, 5, and 6 depict various views of portions of a downhole drilling assembly with motor powered hammer with a guide pin.

FIGS. 2A-6 show various views of an example of a downhole drilling assembly 200 usable, for example, in the drilling system 100 of FIG. 1. As shown in FIG. 2A, the drilling assembly 200 has a stator housing 215, a hammer motor 211, an output shaft adapter 216, a spline driver 224, a hammer 218 and a bit 204. FIGS. 2B-6 show detailed views of various portions of the drilling assembly 200 of FIG. 2A.

Figure 2B:
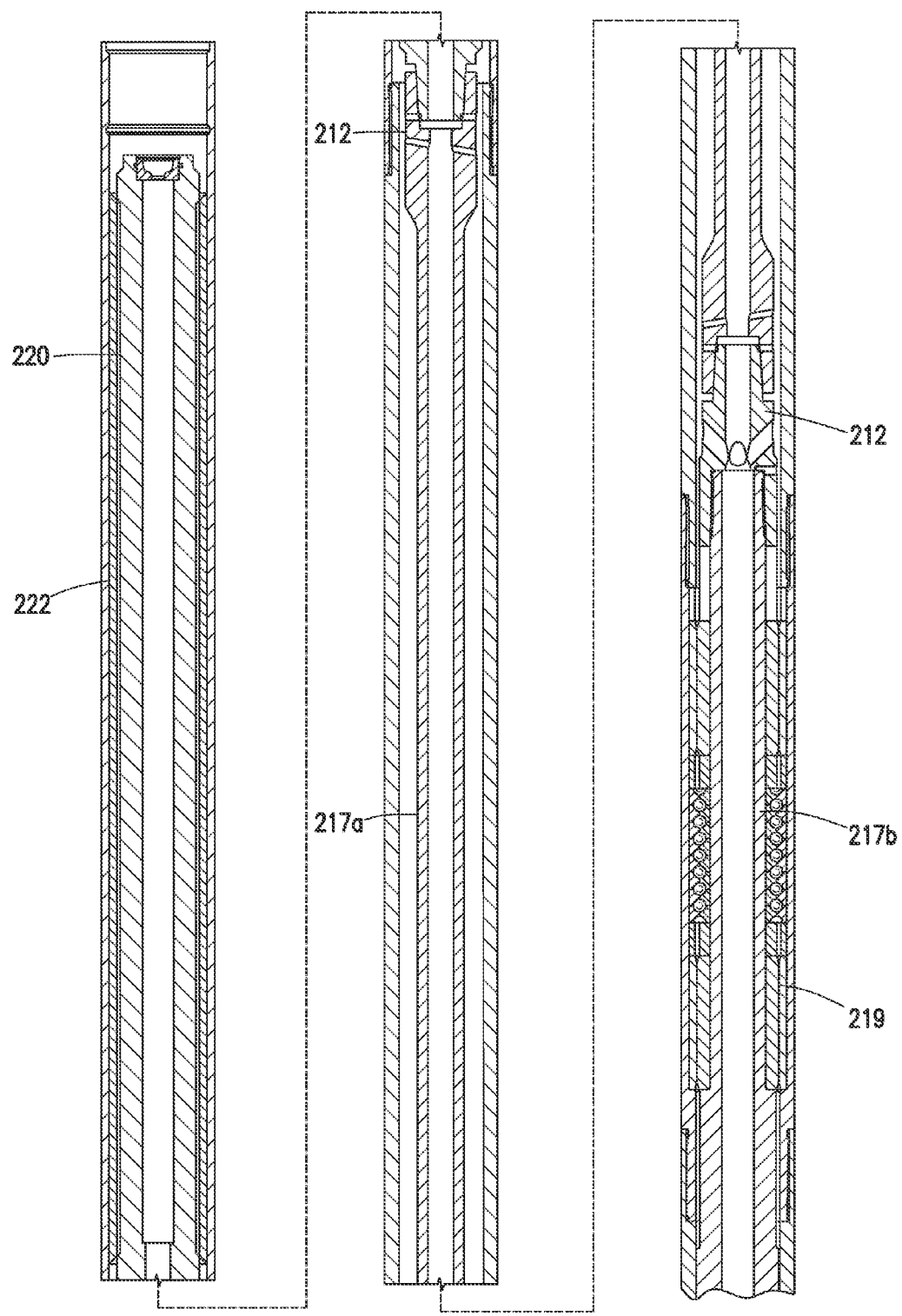

FIG. 2B shows the hammer motor 211 in greater detail. The hammer motor 211 may be a conventional drilling motor, such as those described herein. Small modifications may be made to the lower end of the hammer motor 211 (i.e. outer bearing, casing, bit box and/or output shaft). Fluid passes through the drilling assembly 200 to rotationally drive the hammer motor 211. The hammer motor 211 has a rotor 220 rotationally driven within a stator 222 as fluid flows therethrough. The hammer motor 211 may also be provided with joints 212 (e.g., universal joints), motor shafts 217*a,b*, bearings 219 and other features. Motor shafts 217*a,b* as shown include a flexible shaft 217*a* and an output shaft 217*b*.

Figure 2C:
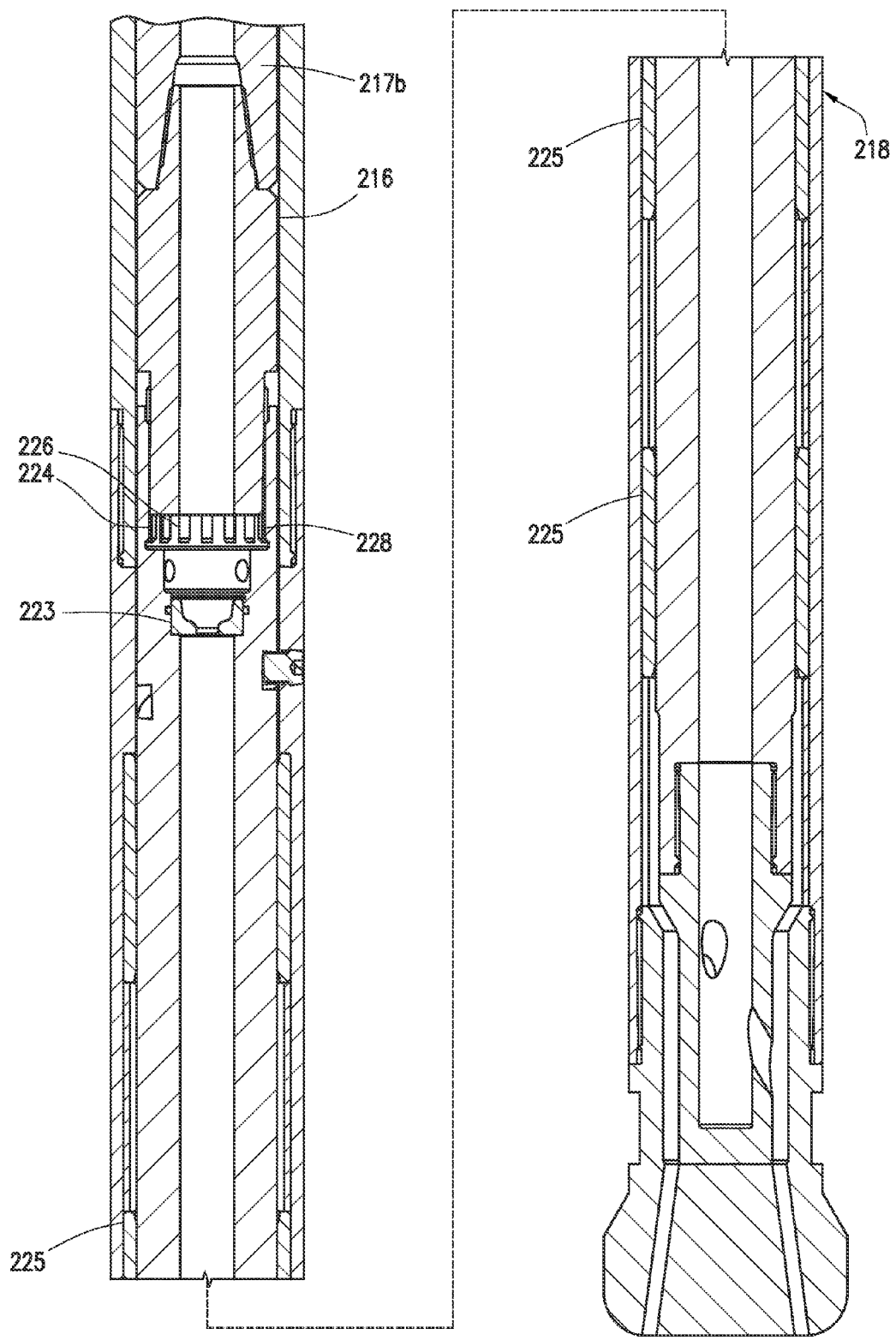

As shown in FIGS. 2A-2C, fluid passes through the hammer motor 211, through the output shaft adapter 216 and hammer 218, and out the bit 204. Flow restrictors 225 (e.g., journal or other bearings) may optionally be inserted about the drilling assembly 200 to provide, for example, about 0.010 to about 0.020 inches (2.54 to 5.08 mm) clearance. Coating (e.g., tungsten carbide coating) may optionally be applied about the drilling assembly 200 to prevent wear due to, for example, fluid flow therethrough.

Figure 3:
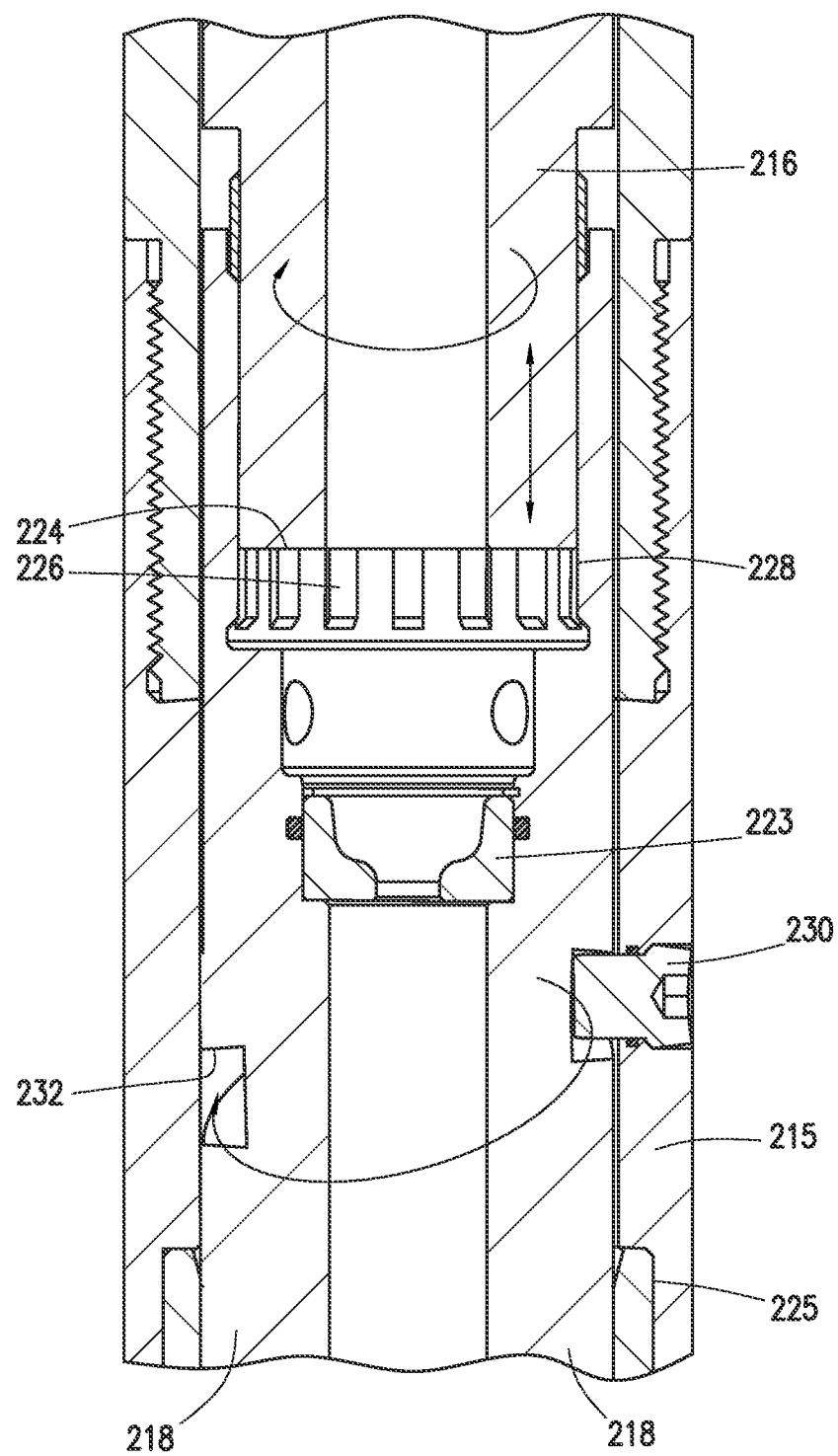

As shown in FIGS. 2C and 3, a nozzle 223 may also be provided to selectively restrict flow through the downhole drilling assembly 200. The nozzle 223 may be used to increase the pressure drop and increase thrust of the hammer. For example, the flow may be restricted with the nozzle 223 to increase downward thrust force of the hammer 218. In an example, the nozzle 223 may be a valve (e.g., vent valve) rotatably or axially positionable about the housing 220 by movement of the output shaft 216 to selectively restrict a flow path therethrough.

The output shaft adapter 216 extends downhole from a downhole end of the out shaft 217*b*. The output shaft adapter 216 is connected to the spline drive 224. The spline drive 224 has internal drive splines 226 on an inner surface thereof. The inner drive splines 226 are engageable with corresponding outer splines 228 on the hammer 218 for rotation therewith as shown in FIG. 5. As the output shaft adapter 216 rotates with hammer motor 211, the spline drive 224 and hammer 218 rotate therewith. Bearings 225 (e.g., radial bearings) may be provided to support the hammer 218 in the housing 215 during operation.

Figure 4B:
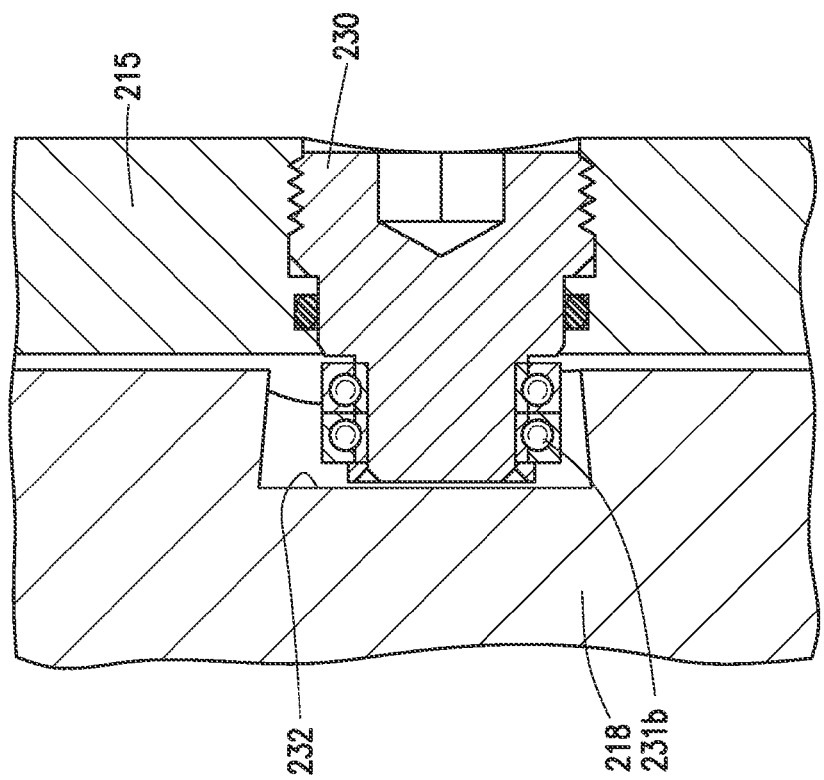
Figure 4A:
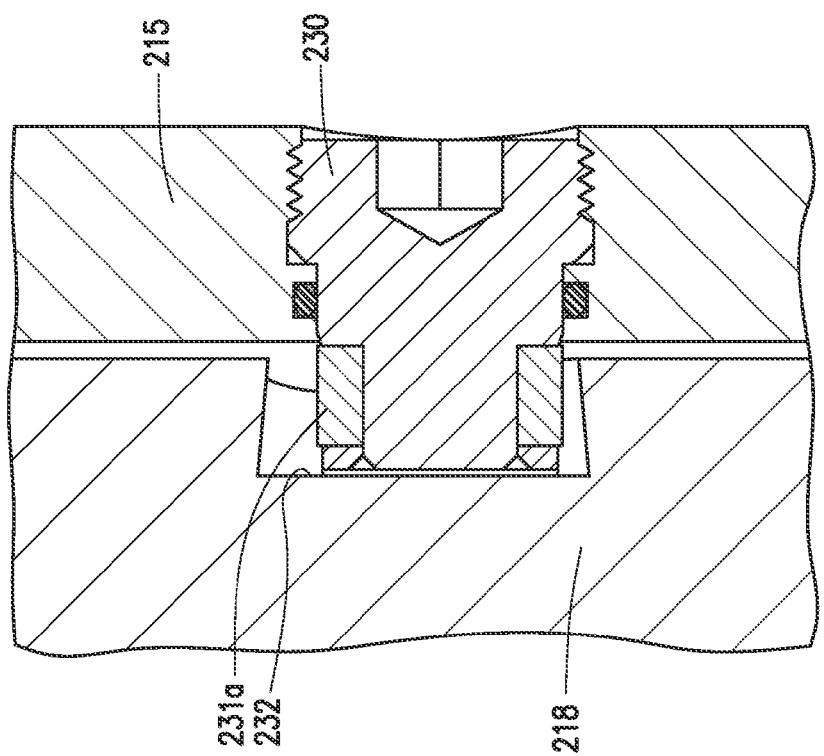

As shown in FIGS. 3-5, guide pins 230 extend through the housing 215 and into a guide channel 232 on an outer surface of the hammer 218. As shown, three guide pins 230 are provided about the hammer 218, but a desired number (e.g., from about 1 to about 6 guide pins 230) may be provided to facilitate operation thereof. The guide pins 230 may be rotationally supported in the guide channel 232 by bearings, such as journal bearings 231*a* as shown in FIG. 4A and/or ball bearings 231*b* as in FIG. 4B. The guide pins 230 may be provided with a bearing assembly with the bearings 231*a,b* mounted therearound to support the guide pins 230 for rotation and wear prevention.

The guide channel 232 slidingly receives the guide pins 230 as the hammer 218 rotates within the housing 215. The guide channel 232 has a wave pattern (FIG. 5) with peaks and valleys to define a path for movement of the guide pins 230 therealong. The wave (or undulating or helical) guide channel 232 may act as a gear box to convert motor rotation into axial reciprocation of the hammer. The guide channel 232 design may be, for example, a shallow sine wave (or undulating) profile helix. Impact may be diverted away from the guide pins 230 by providing milled cut-outs at a downhole end of the wave pattern. The wave pattern may be configured to prevent the guide pins 230 from bottoming out on the tops of the milled undulating profile and/or to prevent potential wear, bending and/or deformation of the guide pins 230 and the guide channel 232 as they are subject to loading. In the examples shown with three guide pins 230, the hammer 218 impacts three times per rotation. The number of impacts may be adjusted by the number of guide pins and the shape of the guide channel 232. Axial speed of the hammer 218 can be calculated based on the wave profile of the guide channel 232 that is provided and the speed of rotating the hammer motor 218.

The shape of the guide channel 232 may be configured to allow the hammer 218 to move axially back and forth in a reciprocating pattern as the hammer 218 rotates within the housing 215. The hammer 218 may move axially within the housing 215 and independent of axial movement of the housing 215. The hammer 218 may be movable within the housing 215 such that the hammer is independent of weight on bit applied to the housing 215 from the surface.

As the hammer 218 reaches a downhole portion of the guide channel 232 and 'bottoms out,' the hammer head 227 contacts the bit 204 as indicated by the arrow in FIG. 6. When at a bottom of the wave profile, the hammer action may be used to provide a small force/high frequency impact to the bit 104. As the hammer 218 moves along the wave pattern to an uphole position, the hammer head 227 retracts a distance from the bit 204. A downhole end of the hammer head 227 and an uphole end of the bit 204 may have corresponding large flat circular surfaces for shock absorption and wear prevention. Optionally, the hammer head 227 may be provided with, for example, splayed and swaged metal or inserts to prevent wear.

A mass force of the hammer 218 at impact may be calculated, with the force being equal to a pressure drop across the flow area (e.g., at the nozzle 223) times the area between a flow restrictor, such as radial bearing 225 diameter) and the flow area at the nozzle 223. Bypass flow may cool the flow restrictors 225 which pass through holes above the guide pins 230 in the hammer 218, for example where a sealed bearing output shaft motor is used. Bypass leakage may be from about 5 to about 15 percent of total flow rate through the downhole drilling assembly 200, but with about 100% of the flow exiting nozzles in the bit 204. Flow through the drilling assembly 200 and/or the drilling motor 211 may be configured as shown, for example, in FIG. 1.

The bits as used herein may be connected to the housing of the drilling assembly 200, for example, by a threaded joint, a splined or a flexible bellows connection. As shown, for example, in FIGS. 2-13, the threaded joint connection may be used, for example, which will result in the outer casing to at least partially absorb forces on the drilling assembly as the hammer moves between a non-contact position and a contact position about the bit. The forces may be absorbed to reduce the force on the bit. For the splined connection or flexible bellows at the bit (as shown for example in FIGS. 21-28) the full hammer force may be transferred to provide more force on the bit. A threaded connection may also absorb some of the hammer input. Sealing may be needed for the various connections, such as the splined connection. The flexible bellows connection may provide an intermediate design, for example, to eliminate the need for dynamic sealing as may be needed with a splined connection.

FIGS. 7-8 show various views of an example of a drilling assembly 700 with a hammer motor 711 usable, for example, in the drilling system 100 of FIG. 1. The drilling assembly 700 has a housing 715, the hammer motor 711, an output shaft adapter 716, a spline drive 724, a hammer 718 and a bit 704. The hammer motor 711 may employ, for example, the hammer motor 211 of FIGS. 2A-6 having a rotor rotationally driven within a stator as fluid flows therethrough. The hammer motor 711 may also employ other components similar to the hammer motor 211, such as nozzle 723.

The hammer motor 711 is coupled to the output shaft adapter 716. The output shaft adapter 716 is connected to the spline drive 724 and rotates therewith. Flow Restrictors 725 (e.g., radial bearings) are provided to support the hammer 718 in the housing 715. A rotating guide ring 730 is positioned on the spline drive 724 and rotates therewith. Spacers 735 may optionally be provided adjacent the flow restrictors 725. The spline drive 724 has drive splines 726 engageable with corresponding guide splines 728 on the rotating guide ring 730 for rotation therewith.

The rotating guide ring 730 is movably positionable adjacent a fixed guide ring 732. The rotating guide ring 730 and the fixed guide ring 732 have mated cam surfaces 733a,b thereon for cam interaction therebetween. The fixed guide ring 732 slidingly receives the rotating guide ring 730 as the rotating guide ring 730 is rotated by output shaft adapter 716 within the housing 715. As shown, the cam surfaces 733a,b each have a corresponding undulating wave pattern to define a path for movement of the rotating guide ring 730 along the fixed guide ring 732. The cam surface 733a of the rotating guide ring 730 moves between a fully aligned position and a non-aligned position along the cam surface 733b of the fixed guide ring 732 as the rotating guide ring 730 rotates relative thereto.

The shape of the wave profile defined by the mated cam surfaces 733a,b may have a similar helical shape to the guide channel 232 of FIGS. 3-6 for providing similar reciprocation of the hammer 718. The shape of the fixed guide ring 732 may be configured to receive the rotating guide ring 730 and allow the hammer 718 to move axially back and forth in a reciprocating pattern as the output shaft adapter 716 rotates the rotating guide ring 730 within the housing 715. As the rotating guide ring 730 moves between the aligned and non-aligned positions, the hammer 718 is axially reciprocated back and forth. The hammer 718 has a hammer head 727 extending therefrom for contact with the bit 704. In the aligned position, the rotating guide ring 730 'bottoms out' and the hammer 718 impacts the bit 704. The hammer 718 is retracted a distance from the bit as the rotating guide ring 730 moves to a non-aligned (or uphole) position.

The hammer impacts may be configured to avoid absorption by the cam surfaces 733a,b. Axial thrust may be taken by flat, horizontal portion of the cam surfaces 733b on the top of the bit 704. The cam surfaces 733a,b act to create reciprocation. The cam surfaces 733a,b may be provided with replaceable inserts to prevent wear. The inserts may be threaded into the hammer 718 and/or bit 704.

As in FIGS. 2A-6, the number of cam peaks and valleys may be selected to provide a desired reciprocation. For example, if using four cams then the reciprocation of the hammer 718 will be for times the rotational speed and the axial speed of the hammer 718 can be calculated. In another example, one cam may be used to give longer life with maximum contact area. The hammer mass force of impact may also be calculated, with the force being equal to the pressure drop across the nozzle 723 times the area between the flow restrictor/radial bearing diameter and the bore of the nozzle.

FIGS. 9-20 depict various configurations of a motor powered hammer with a bit cam. FIGS. 9-12 depict a motor powered hammer with a bit cam and standard motor configuration. FIGS. 13-20 depict a motor powered hammer with a bit cam and a special motor configuration.

FIGS. 9-12 show various views of an example of a drilling assembly 900 with a hammer motor 911 usable, for example, in the drilling system 100 of FIG. 1. This version is similar to the bearing section of FIGS. 2A-8. The hammer motor 911 may be, for example, a standard Positive Displacement Motor (PDM) modified with a new bearing casing with an additional external pin thread and a special output shaft adapter with a splined connection.

Figure 9:
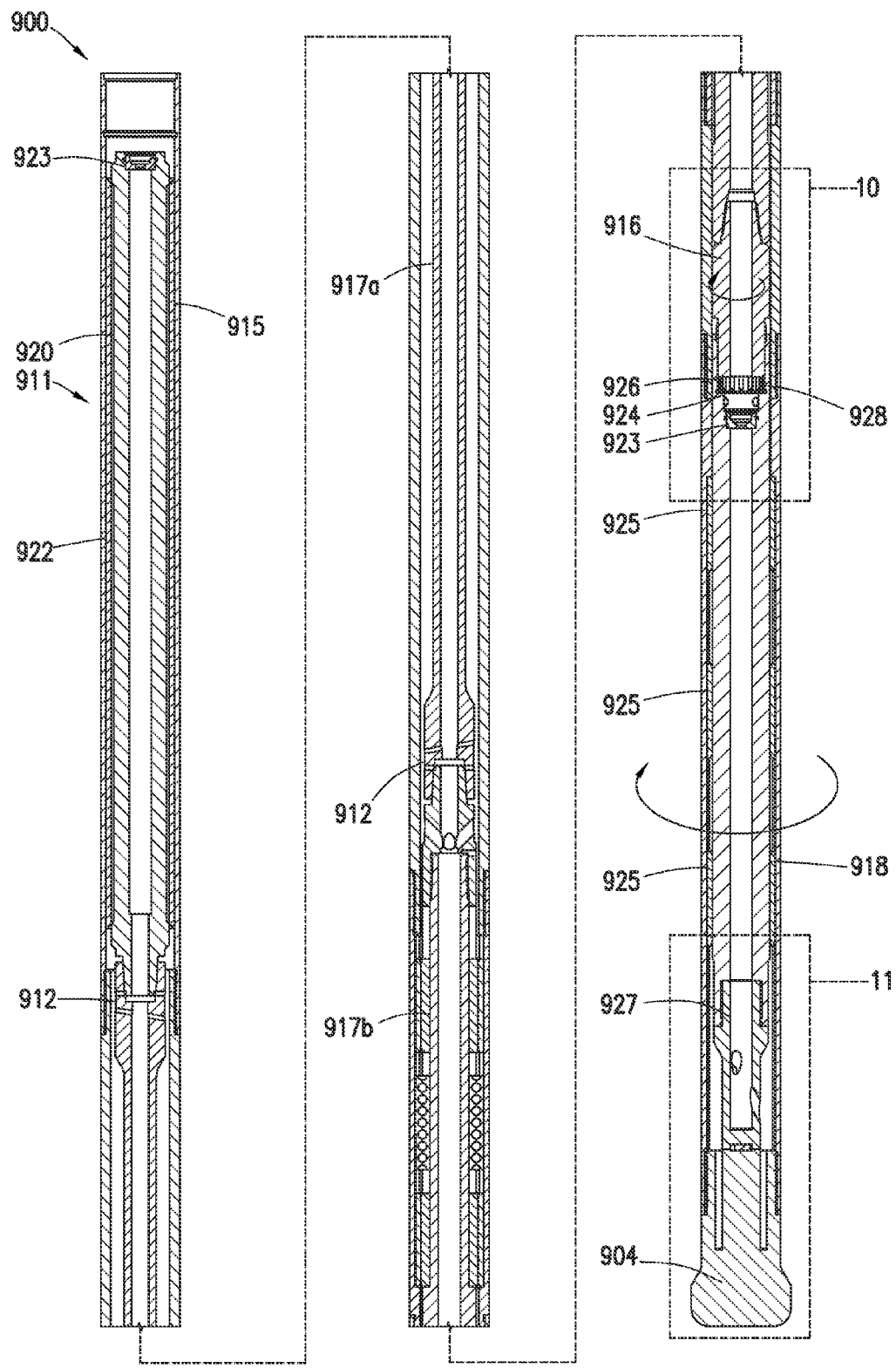
FIGS. 9-12 depict various views of a downhole drilling assembly with motor powered hammer with bit cam.

The drilling assembly 900 of FIG. 9 has a housing 915, the hammer motor 911, an output shaft adapter 916, spline drive 924, a hammer 918 and a bit 904. The hammer motor 911 has a rotor 920 rotationally driven within a stator 922 as fluid flows therethrough. A nozzle 923 may also be provided to selectively restrict flow through the downhole drilling assembly 900. As shown, two nozzles are provides, one at the top of the rotor 920 and another uphole of hammer 918.

Figure 10:
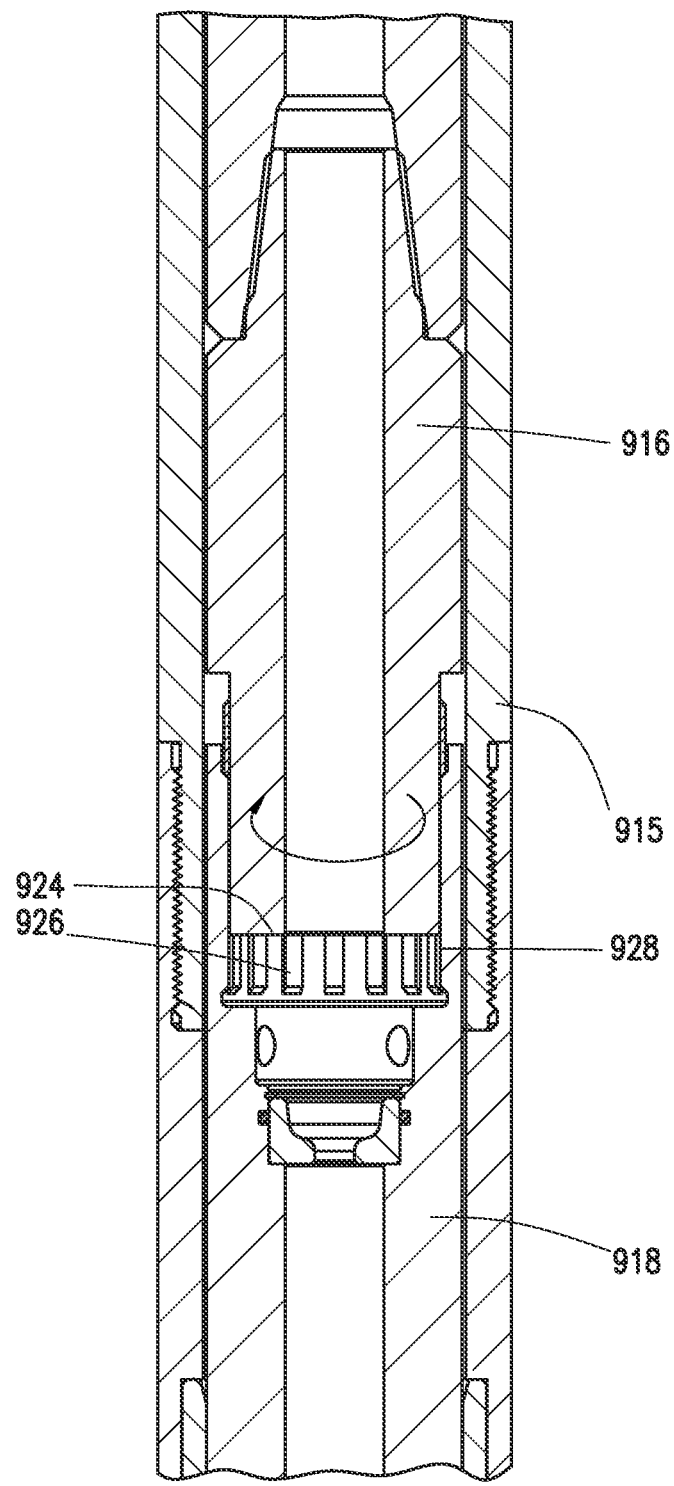

As shown in FIGS. 9 and 10, the hammer motor 911 has flexible shaft 917a and output shaft 917b coupled by threaded connections 912. The downhole motor shaft 917 is coupled to the output shaft adapter 916. The output shaft adapter 916 is connected to the spline drive 924. The spline drive 924 has drive splines 926 on an outer surface thereof engageable with corresponding hammer splines 928 on an inner surface of the hammer 918. As the output shaft adapter 916 rotates with hammer motor 911, the spline drive 924 and hammer 918 rotate therewith. Bearings 925 (e.g., radial bearings) are provided to support the hammer 918 in the housing 915.

Figure 11:
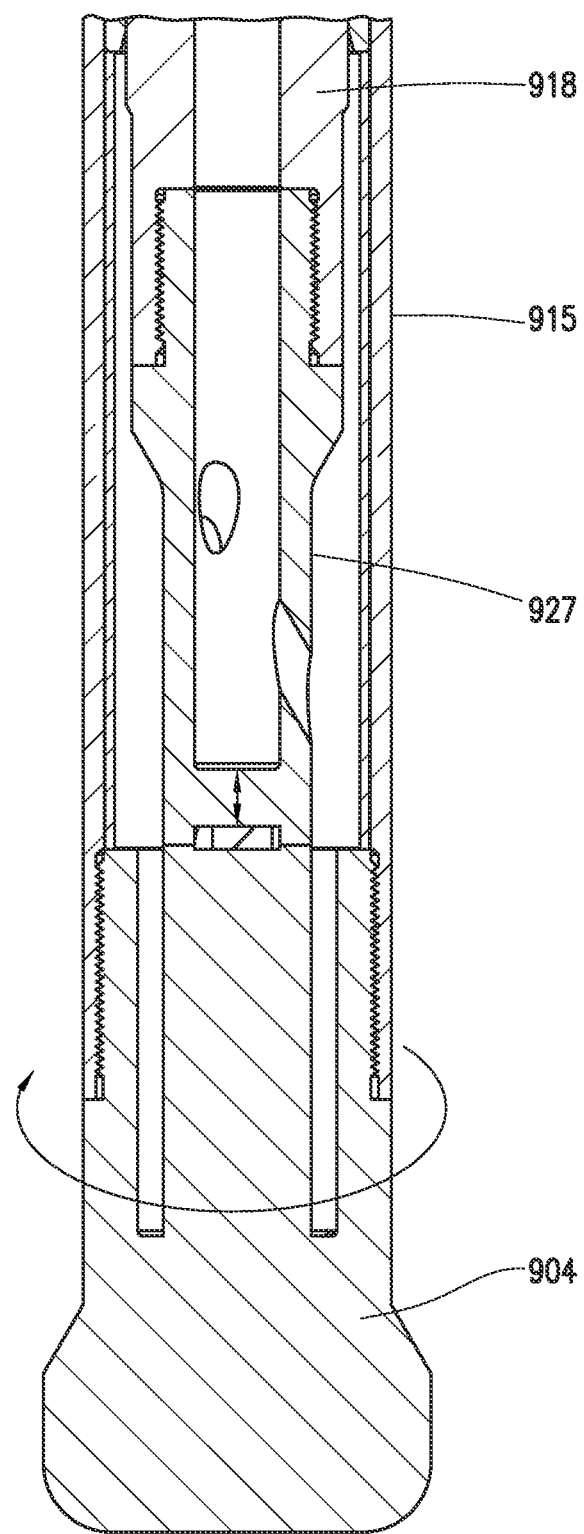
Figure 12:
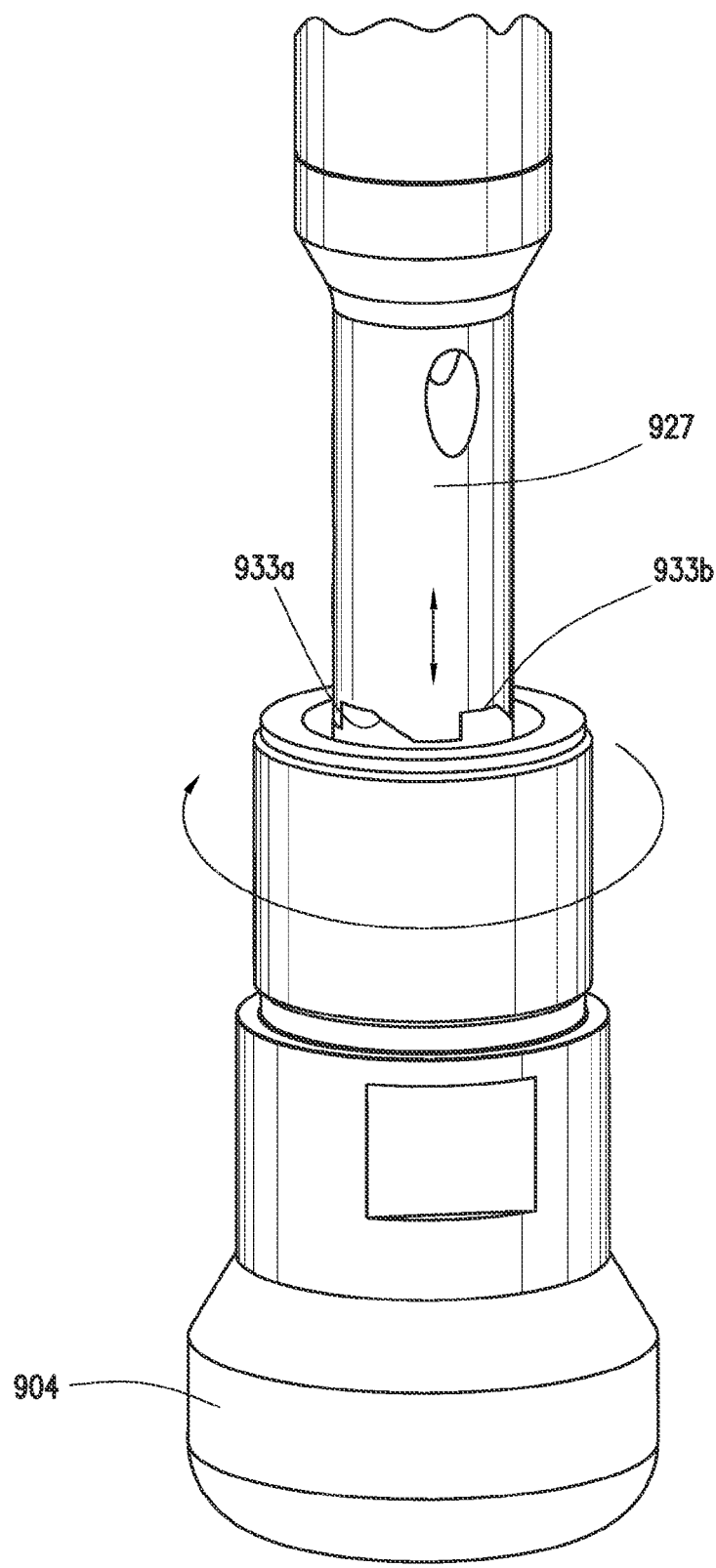
Figure 13:
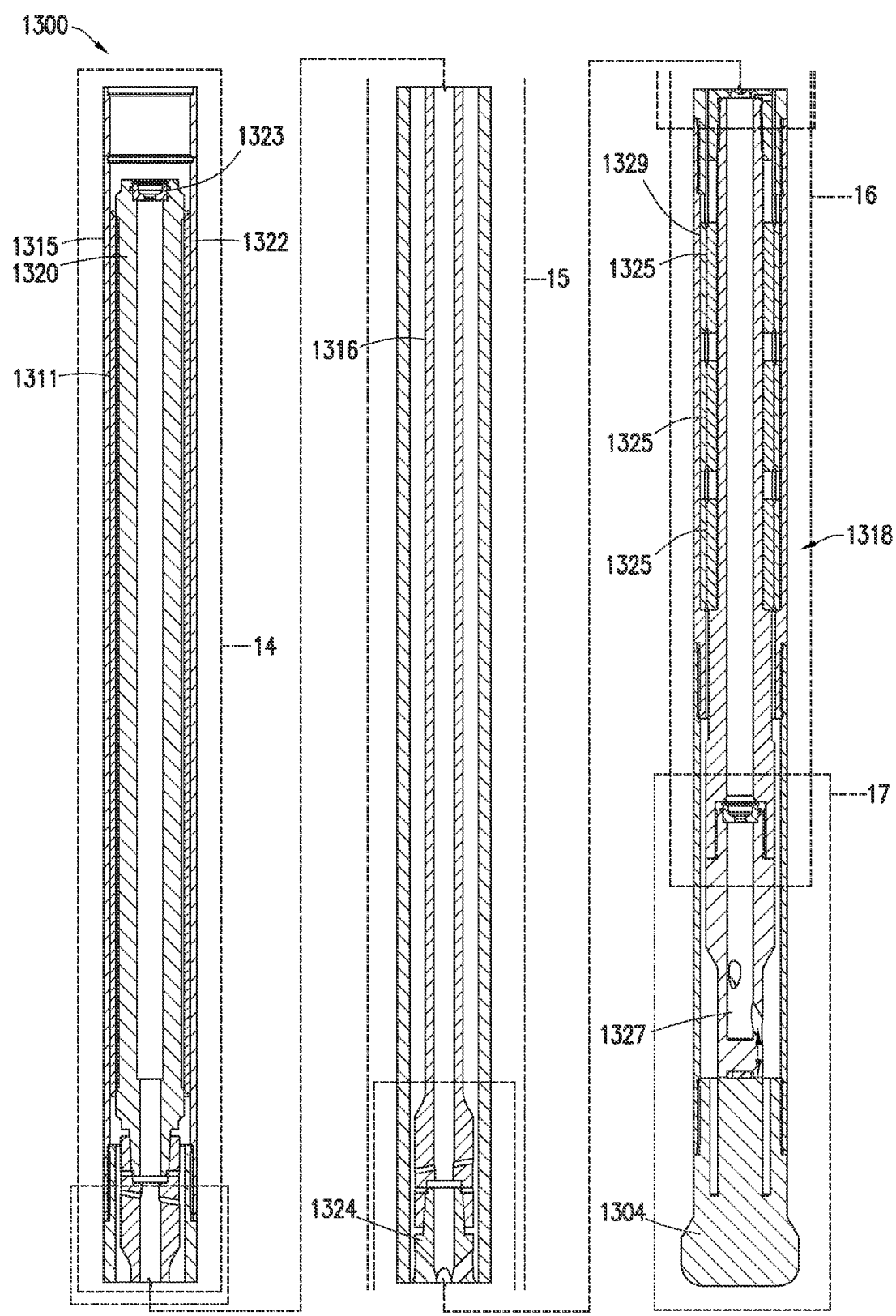
Figure 16:
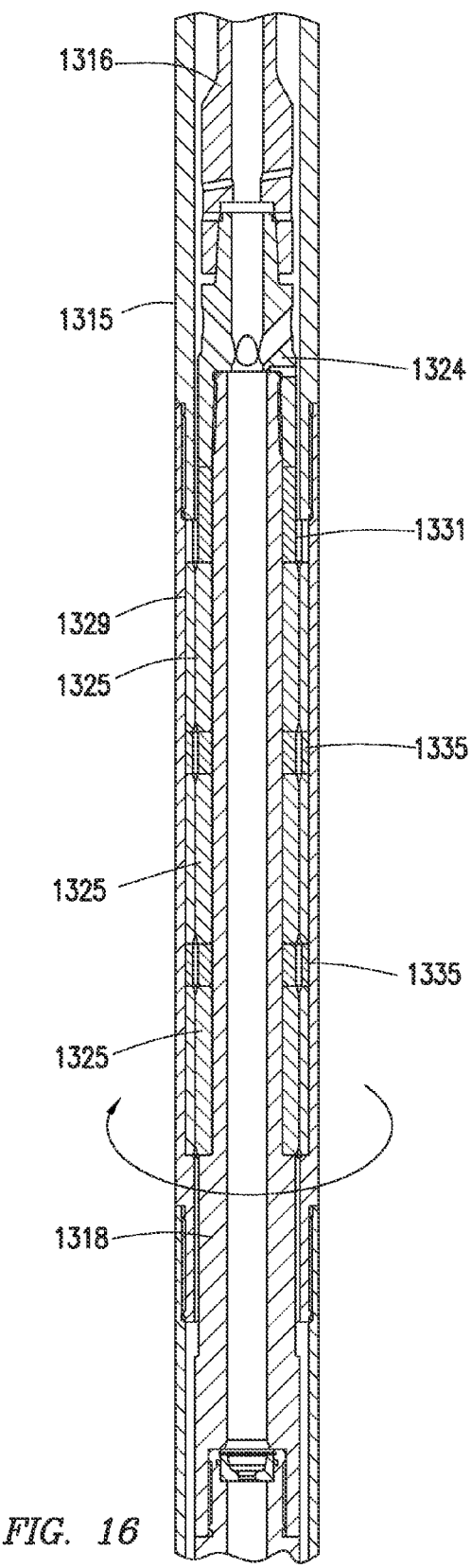
Figure 17:
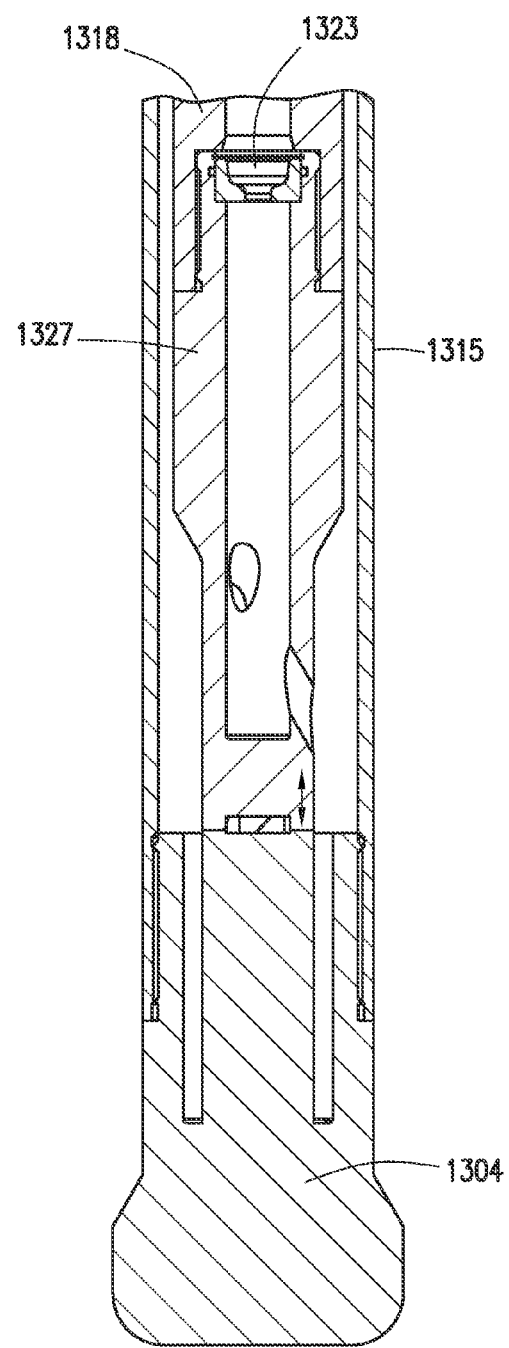

As shown in FIGS. 11 and 12, the hammer 918 has a hammer head 927 extending therefrom for contact with the bit 904. A downhole end of the hammer head 927 has a wave pattern therealong defining a cam surface 933a. An uphole end of the bit 904 has a corresponding wave pattern therealong defining a mated cam surface 933b for receiving the cam surface 933a. In the aligned position, the rotating hammer head 1927 'bottoms out' and the hammer 918 impacts the bit 904. The hammer 918 is retracted a distance from the bit as the cam surface 933a rides up along cam surface 933b to an uphole position.

Cam surfaces 933a,b may have a cam pattern similar to the wave profile to that of FIGS. 7-8 for providing the desired reciprocation. As depicted, the wave pattern has an inclined edge to permit the cam surface 933a to slide to the uphole position, and a vertical drop off to permit the cam surface 933a to fall back to a downhole position. The cam pattern defined by the cam surfaces herein, such as the cam surfaces 933a,b, may be configured to allow the hammer 918 to move axially back and forth in a reciprocating pattern as the hammer 918 rotates within the housing 915. As the hammer 918 reaches a downhole portion of the cam surfaces 933b and 'bottoms out,' the hammer head 927 is in full contact with the bit 904. As the hammer 918 moves along the cam pattern to an uphole position, the hammer head 927 retracts a distance from the bit 904 and hammers the bit 904 as it returns to the bottomed out position. As the hammer 918 moves to the bottom position, the hammer 918 impacts the bit 904, thereby providing percussive impact.

FIGS. 13-20 depict a motor powered hammer with a bit cam and special motor configuration. This version as depicted has no thrust bearings in the hammer motor. The motor may be a special PDM configuration that provides a flexible shaft below the rotor. The configuration may be used, for example, to eliminate the requirement of having axial bearings and/or u-joints inside the downhole drilling assembly, to reduce the number of moving parts.

FIGS. 13-20 show various views of an example of a drilling assembly 1300 with a hammer motor 1311 usable, for example, in the drilling system 100 of FIG. 1. The drilling assembly 1300 has a housing 1315, the hammer motor 1311, a flexible transmission shaft 1316, an output shaft coupling 1324, a hammer 1318 and a bit 1304.

As shown in FIGS. 13-16, the hammer motor 1311 has a rotor 1320 rotationally driven within a stator 1322 as fluid flows therethrough. A nozzle 1323 may also be provided increase the flow rate which can be pumped past the rotor/stator.

The rotor 1320 has the flexible transmission shaft 1316 extending downhole therefrom. The flexible transmission shaft 1316 is a flexible shaft connected to a hammer 1318 by the output shaft coupling 1324. The flexible transmission shaft 1316 may have taper drives at each end thereof. The taper drives may be, for example, 1:10 or 1:20 Morse Tapers or threaded connections. The output shaft coupling 1324 is connected the hammer 1318, and applies rotation thereto. As the flexible transmission shaft 1316 rotates with hammer motor 1311, the output shaft coupling 1324 and hammer 1318 rotate therewith.

Bearings (e.g., journal bearings) 1325 are provided to support the hammer 1318 in the housing 1315, and act as flow restrictors to control flow therethrough. The number of bearings 1325 may be selected as desired. For example, one set, rather than three sets as shown, may be used. Outer bearings (e.g., journal bearings) 1329 are positioned about the bearings 1325 and may be held in compression by an over-sized adjusting ring 1331. Spacers 1335 may also be provided between the bearings.

Figure 18:
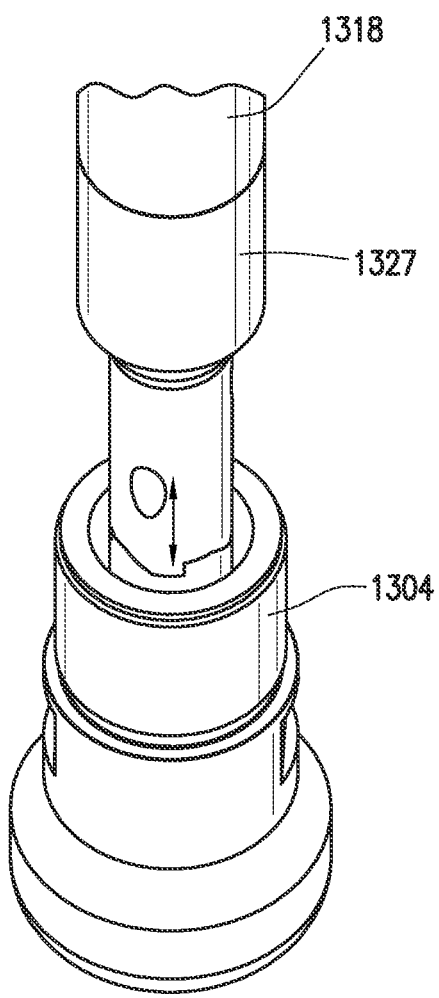
Figure 19:
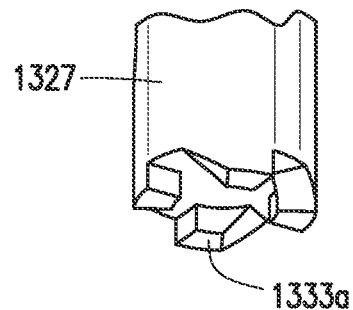
Figure 20:
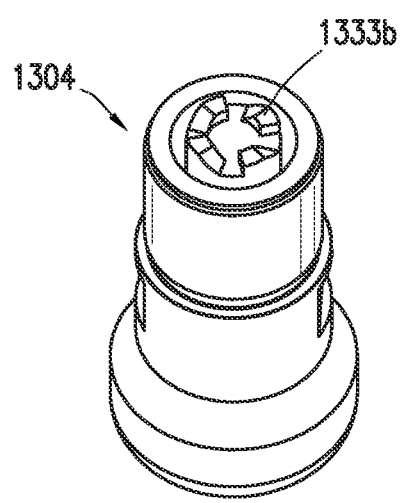

As shown in FIGS. 18-20, the hammer 1318 has a hammer head 1327 extending therefrom for contact with the bit 1304. A downhole end of the hammer head 1327 has a cam pattern therealong defining cam surface 1333a. An uphole end of the bit 1304 has a corresponding cam pattern therealong defining mated cam surface 1333b for receiving the cam surfaces 1333a. The cam surfaces 1333a,b may operate similar to, for example, the cam surfaces 933a,b described herein. In the aligned position, the hammer 1318 'bottoms out' and the hammer head 1327 impacts the bit 1304. The hammer head 1327 is retracted a distance from the bit 1304 as the cam surface 933a rides up an incline of cam surface 933b to the uphole position.

The shape of the cam surfaces 1333a may be configured to allow the hammer 1318 to move axially back and forth in a reciprocating pattern as the hammer 1318 rotates within the housing 1315. As the hammer 1318 'bottoms out,' the hammer head 1327 is in full contact with the bit 1304. As the hammer 1318 moves along the cam pattern to an uphole position, the hammer head 1327 retracts a distance from the bit 1304 and hammers the bit 1304 as it returns to the bottomed out position.

Figure 21A:
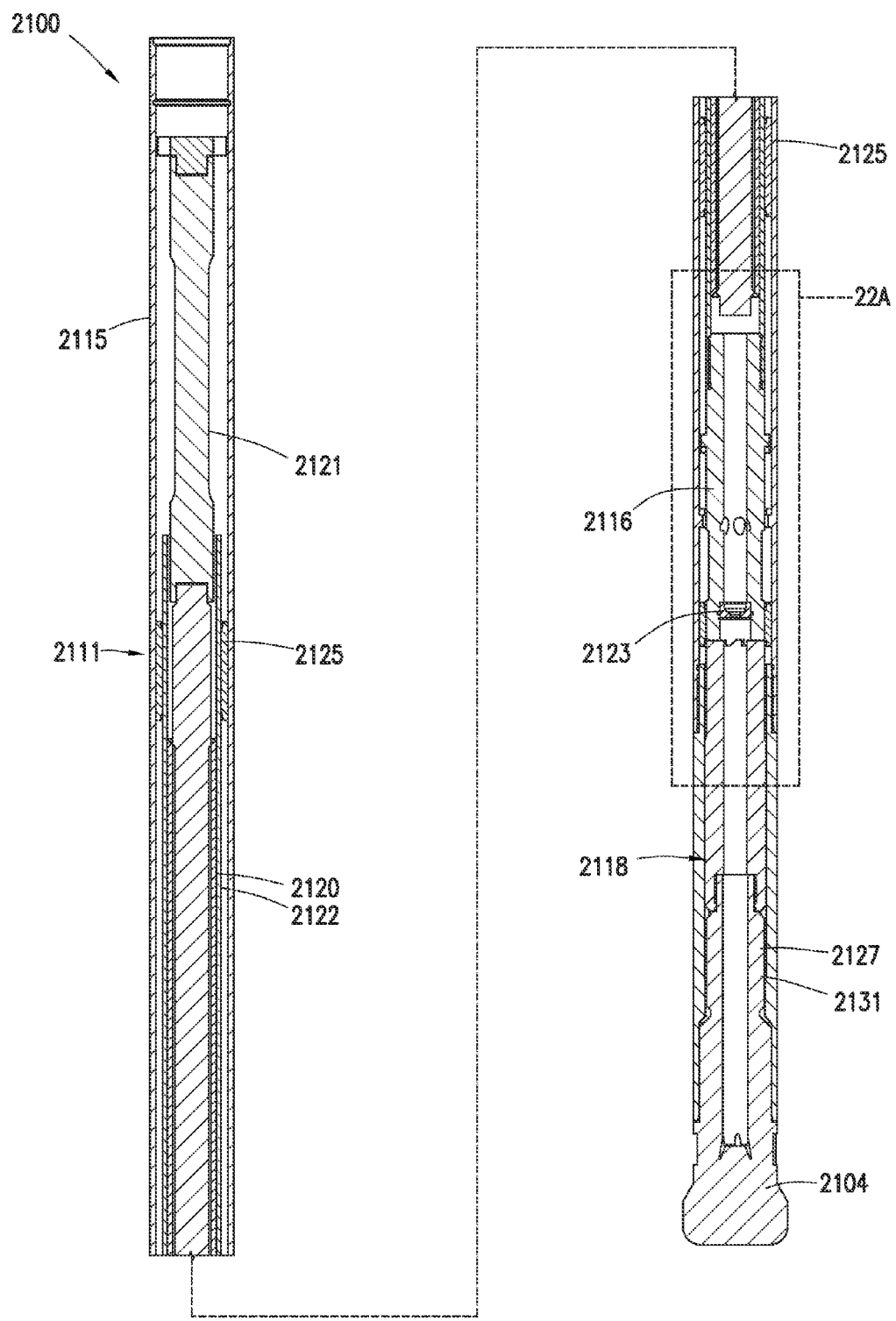
Figure 23:
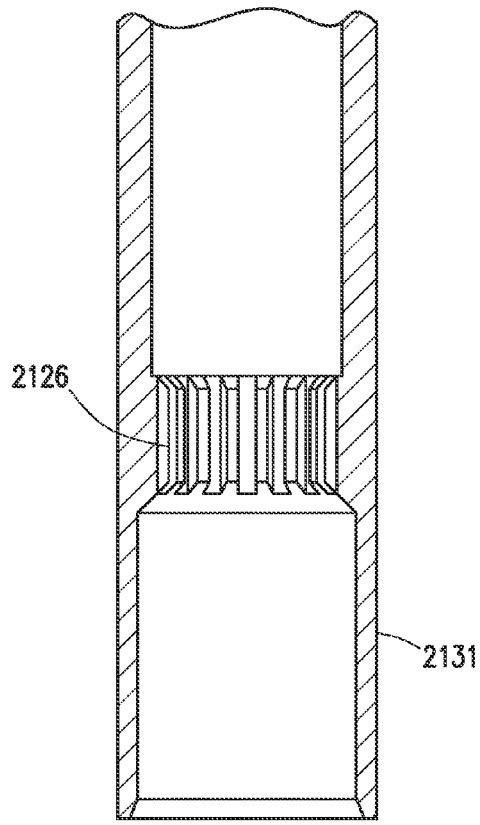
Figure 24:
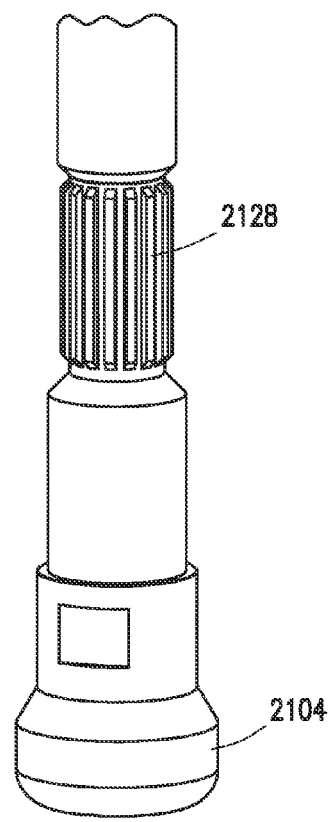
Figure 25A:
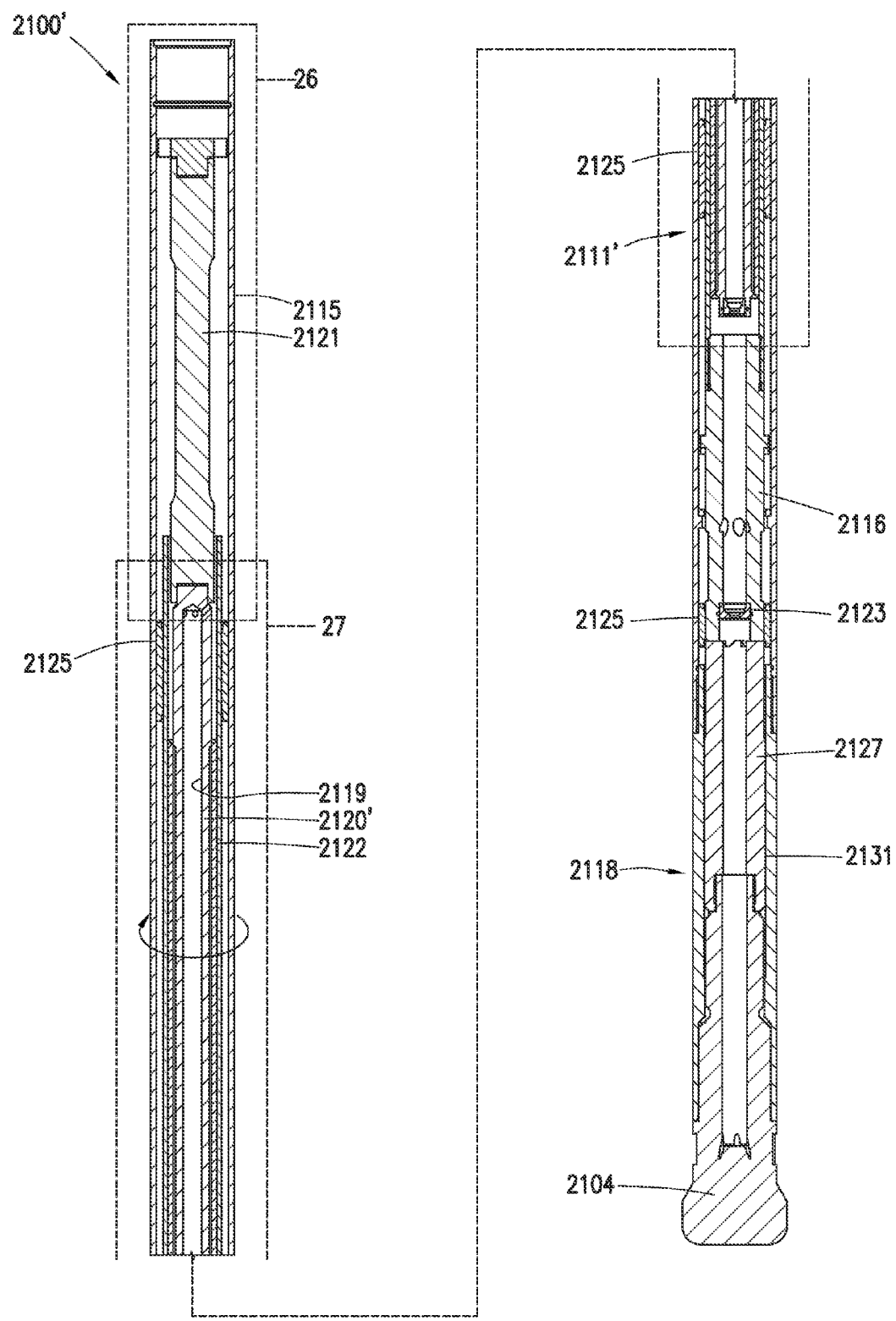
Figure 25B:
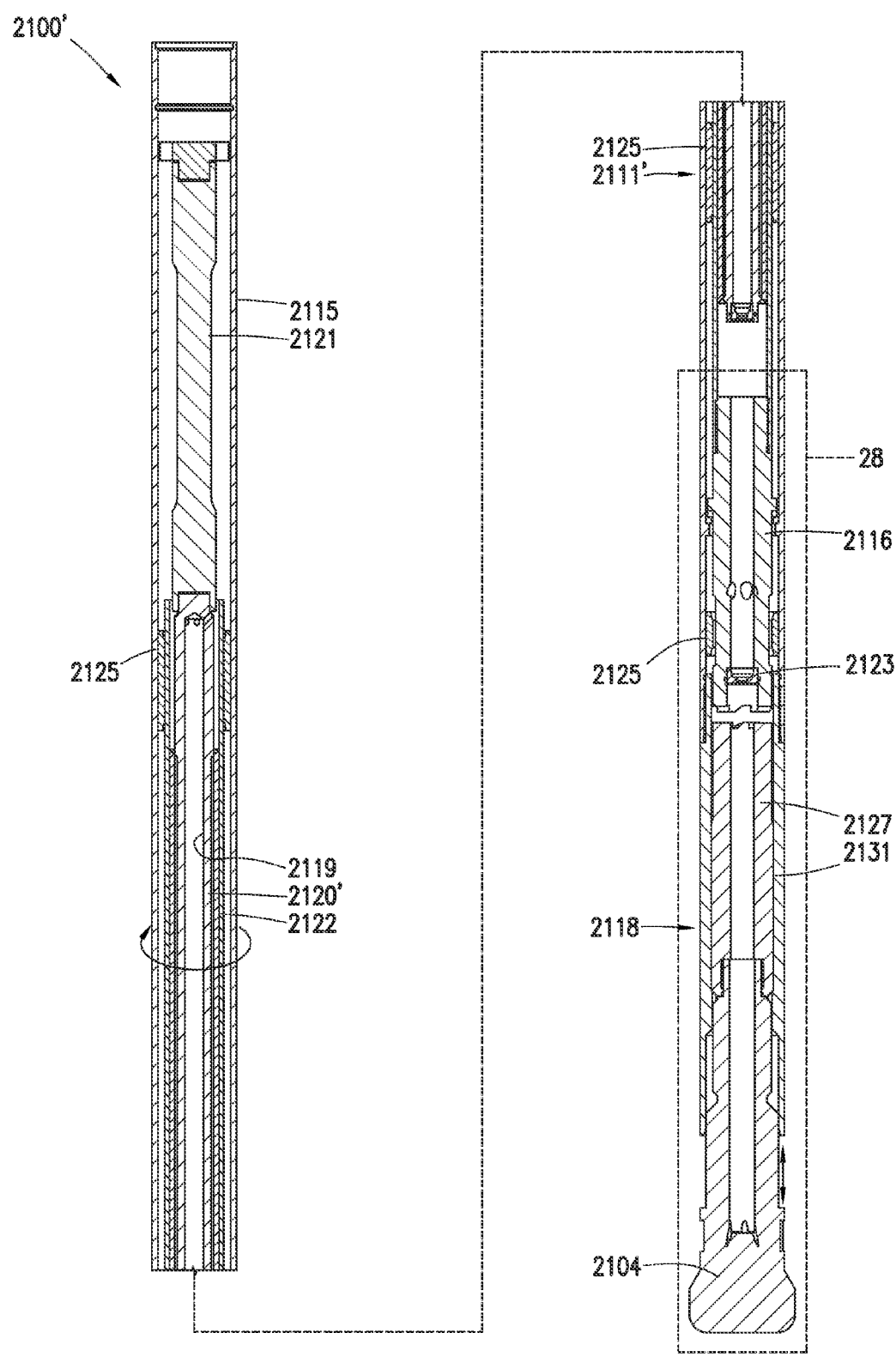
Figure 28:
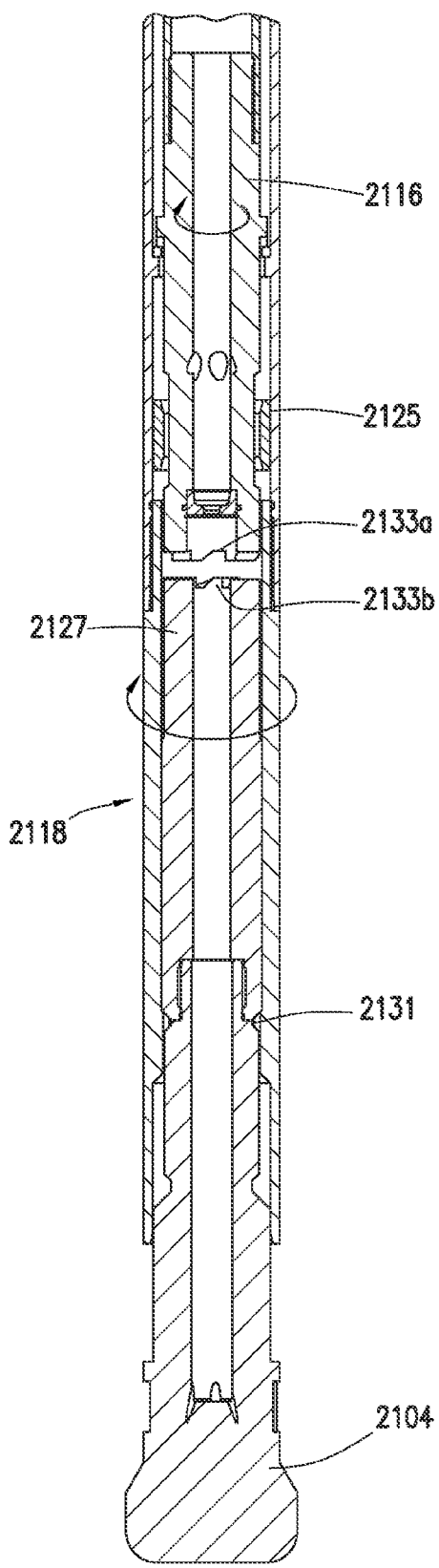

FIGS. 21A-28 depict various views of downhole drilling assemblies with motors. FIGS. 21 and 25 depict drilling assemblies with motors having a rotating (about its own axis) stator mounted in radial journal bearings with a non-rotating (about its own axis) rotor, with the rotor moving in a planetary orbital manner inside the stator with a given eccentricity. FIGS. 21A-24 show a drilling assembly with a solid rotor. FIGS. 25-28 show a drilling assembly with a hollow rotor. In these configurations, when the drill bit is off bottom, a pressure drop across the drill bit causes the hammer to cease reciprocation while the drilling motor continues to rotate. This provides a configuration that automatically switches the hammer off when circulating off bottom using a splined connection at the bit.

FIGS. 21A-24 show various views of an example of a drilling assembly 2100 with a hammer motor 2111 usable, for example, in the drilling system 100 of FIG. 1. The drilling assembly 2100 has a housing 2115, the hammer motor 2111, a stator adapter 2116, a hammer 2118 and a bit 2104.

Figure 21B:
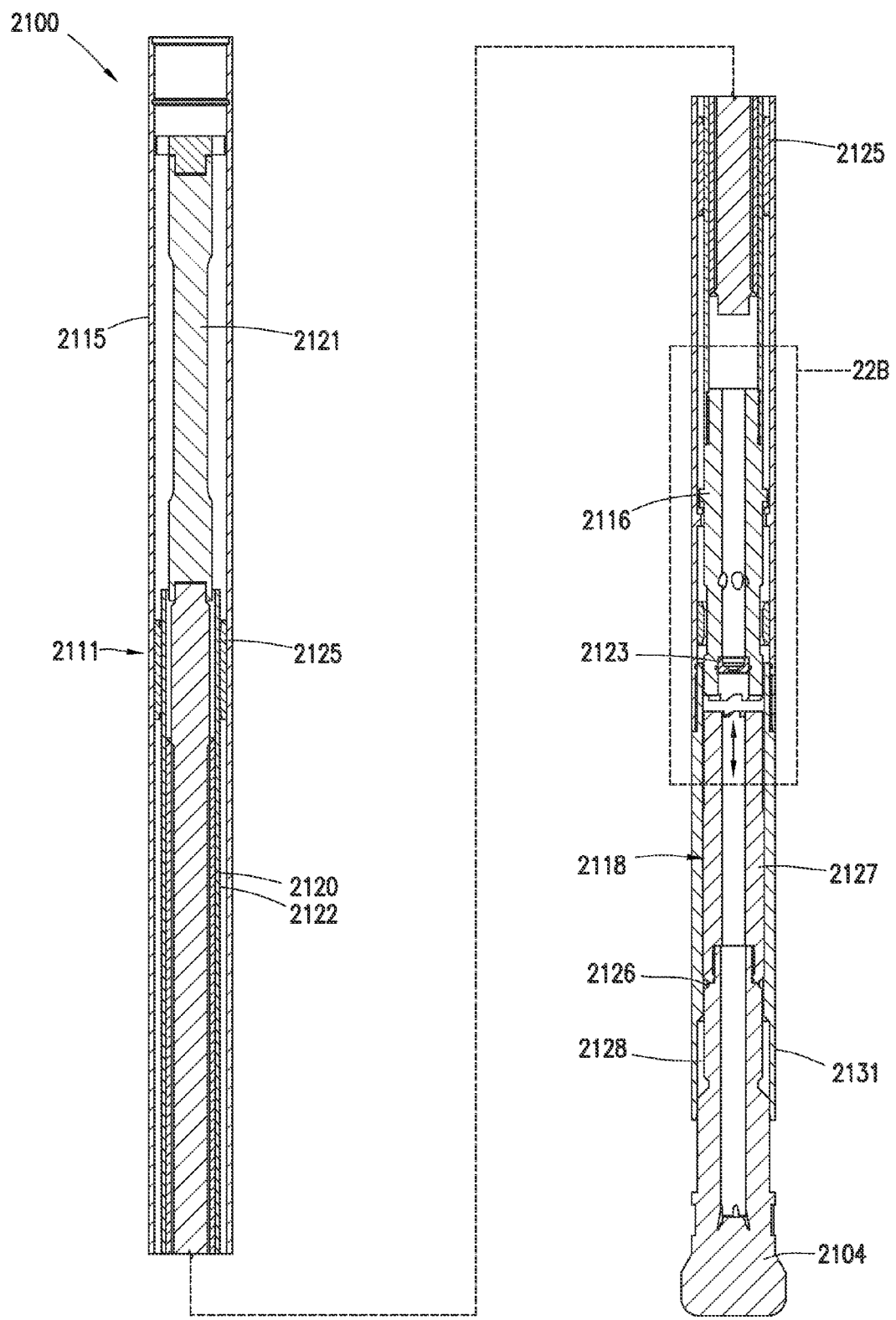

As shown in FIGS. 21A and 21B, the hammer motor 2111 has a solid rotor 2120 and a stator 2122 thereabout. The rotor 2120 may be free to move eccentrically within the stator 2122 using, for example, a double universal joint assembly or a flexible shaft 2121 at an uphole end thereof. Nozzle 2123 may also be provided in the drilling motor 2111 to increase flow capacity. Downhole thrust is provided to the drilling assembly 2100 by the nozzle 2123 and stator 2122.

Bearings 2125 (e.g., radial and/or thrust bearings) are provided to support the stator 2122 in the housing 2115. The bearings may be, for example, plain hard-metal thrust bearings. A stator thrust bearing may also be provided to engage when the drilling assembly 2100 tool is switched off.

The rotor 2120 is supported from an uphole end by the flexible (or u-joint) shaft 2121. As shown in FIGS. 22A and 22B, the stator 2122 has the stator adapter 2116 extending downhole therefrom. A downhole end of an output shaft coupling of the stator adapter 2116 has a cam surface 2133a receivable by a corresponding mated cam surface 2133b on an upper end of bit adapter 2127 of hammer 2118. As the stator adapter 2116 rotates with drilling motor 2111, the cam surface 2133a rotates along the mated cam surface 2133b of the hammer 2118 and causes the hammer 2118 to reciprocate. In an aligned position, the rotating stator adapter 2116 'bottoms out' and impacts the upper end of the bit adapter 2127. The hammer 2118 is retracted a distance from the bit as the cam surface 2133a rides up an inclined portion of cam surface 2133b to an uphole position.

The shape of the cam surfaces 2133a,b may be configured to allow the hammer 2118 to move axially back and forth in a reciprocating pattern as the stator adapter 2116 rotates within the housing 2115. The bit adapter 2127 extends through the hammer 2118 and connects with the bit 2104. As the bit adapter 2127 is pushed downward by the stator adapter 2116, the hammer 2118 'bottoms out.' Because the bit 2104 is connected to the bit adapter 2127, the bit 2104 receives impact (e.g., direct and full) as it is splined to the outer housing 2115. This reciprocation may be similar to that, for example, described with respect to FIGS. 7-8.

Referring to FIGS. 23 and 24, the hammer 2118 has a hammer housing 2131 about the bit adapter 2127 and connected to the housing 2115. The hammer housing 2131 has splines 2126 on an inner surface thereof engageable with mated bit splines 2128 on an outer surface of the bit 2104. The interacting splines 2126, 2128 permit the bit to move axially within the hammer housing while preventing rotation thereof.

The hammer impact is thereby provided on the cam surfaces 2133a,b. As hammering takes place, the bit 2104 and the bit adapter 2127 slide down through the splines as the stator 2122 and stator adapter 2116 move up and down.

FIGS. 25A-28 show various views of an example of a drilling assembly 2100' with a hammer motor 2111' usable, for example, in the drilling system 100 of FIG. 1. The drilling assembly 2100' is the same as the drilling assembly 2100, except that the hammer motor 2111' has a hollow rotor 2120' that permits the flow of fluid therethrough.

At least a portion of the fluid passing through the drilling assembly 2100' may be diverted through cavity 2119 of the hollow rotor 2120'.

Figure 29:
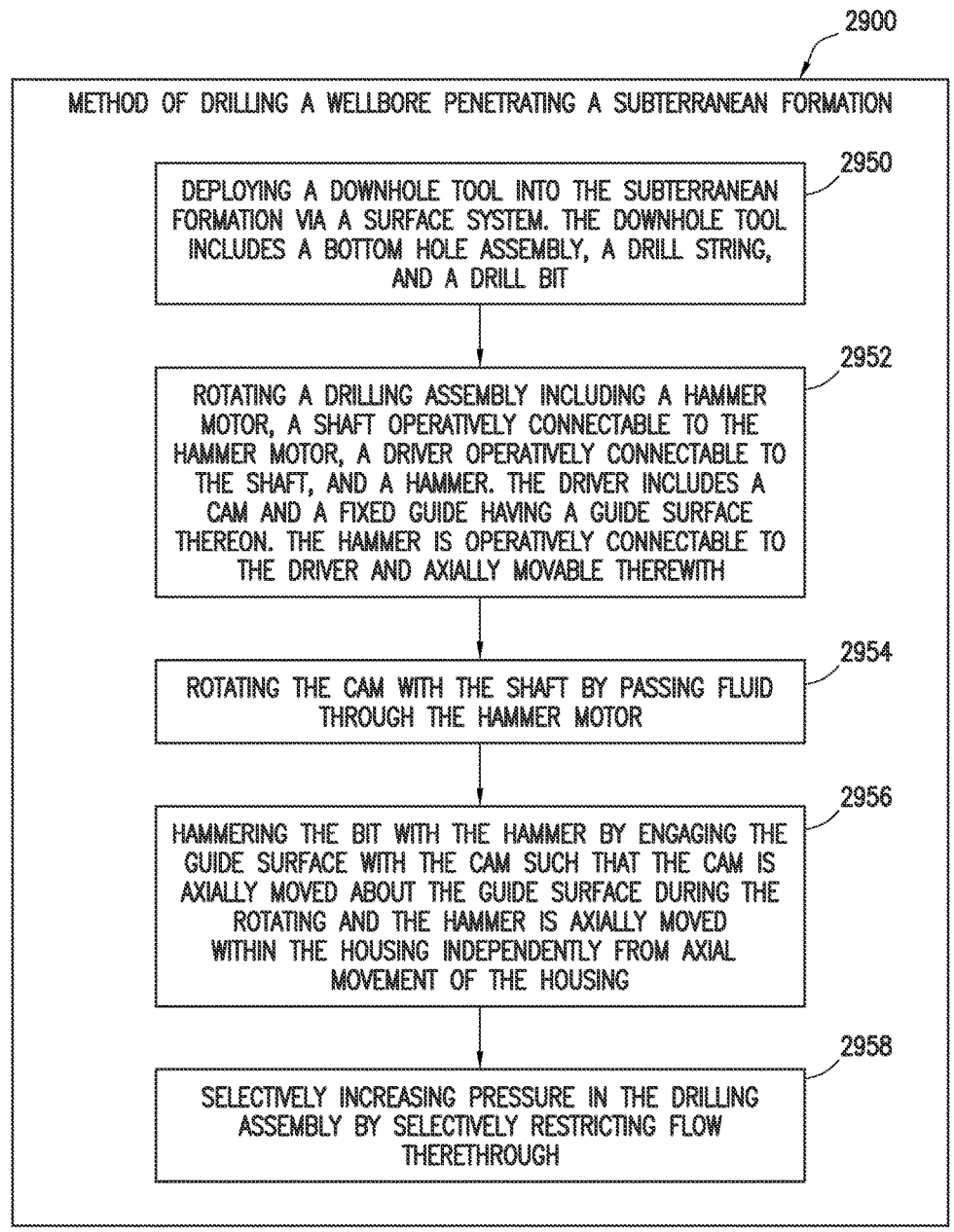
FIG. 29 is a flow chart depicting a method of drilling a wellbore.

FIG. 29 is a flow chart depicting a method 2900 of drilling a wellbore penetrating a subterranean formation. The method involves 2950 deploying a downhole tool into the subterranean formation via a surface system. The downhole tool includes comprising a bottom hole assembly, a drill string, and a drill bit. The method also involves 2952 rotating a drilling assembly comprising a hammer motor, a shaft operatively connectable to the hammer motor, a driver operatively connectable to the shaft, and a hammer. The driver includes a cam and a fixed guide having a guide surface thereon. The hammer is operatively connectable to the driver and axially movable therewith. The method also involves 2954 rotating the cam with the shaft by passing a fluid through the hammer motor, and 2956 hammering the bit with the hammer by engaging the guide surface with the cam such that the cam is axially moved about the guide surface during the rotating. The method may also involve 2958 selectively increasing pressure in the drilling assembly by selectively restricting flow therethrough.

The hammering may also involve slidably positioning pins of the cam about a guide channel of the guide surface, and/or slidably engaging a cam surface of the cam along the guide surface. The method may be performed in any order, and repeated as desired.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more drilling force assemblies may be provided with one or more features of the various drilling assemblies herein and connected about the drilling system.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A drilling assembly of a downhole drilling tool for drilling a wellbore penetrating a subterranean formation, the downhole drilling tool driven by surface equipment and comprising a drill string, a bottom hole assembly, and a drill bit, the drilling assembly comprising:
    a housing positionable about the bottom hole assembly;
    a hammer motor positionable in the housing and rotationally driven by fluid flow therethrough;
    a shaft operatively connectable to the hammer motor and rotatably thereby;
    a driver operatively connectable to the shaft, the driver comprising a cam rotatable with the shaft and a guide having a guide surface thereon, the cam engageable with the guide surface and axially movable thereabout during rotation thereof;
    a hammer operatively connectable to the driver and axially movable therewith, the hammer axially movable within the housing independently from axial movement of the housing, the hammer engageable with the bit to impart an impact thereto whereby the bit is hammered; and
    a fluid passage extending through the drillstring, through the hammer, and through the bit, the fluid passage including a flow restriction positioned to restrict flow of fluid through the hammer and directs an axially-downward fluid force against the hammer when fluid flows through the flow restriction;
    wherein the flow restriction is coupled for movement with the hammer and is axially movable relative to the drill bit.

2. The drilling assembly of claim 1, wherein the flow restriction is a nozzle having an axially extending flow path, the nozzle positionable in the housing to selectively restrict flow of fluid through the fluid passage.

3. The drilling assembly of claim 2, wherein the nozzle is positionable within the portion of the passage extending through the hammer.

4. The drilling assembly of claim 1, wherein the hammer motor comprises a helical stator with a helical rotor rotatable therein.

5. The drilling assembly of claim 4, wherein the helical rotor is solid.

6. The drilling assembly of claim 4, wherein the helical rotor is hollow to permit fluid flow therethrough.

7. The drilling assembly of claim 1, wherein the hammer motor comprises a helical rotor with a helical stator rotatable therein.

8. The drilling assembly of claim 1, wherein the flow restriction is a nozzle having an axially extending flow path, the nozzle being disposed within the hammer at the entry of the portion of the passage extending through the hammer.

9. The drilling assembly of claim 1, wherein the shaft comprises a flexible shaft.

10. The drilling assembly of claim 1, further comprising an adapter operatively connecting the shaft to the driver.

11. The drilling assembly of claim 1, wherein the driver has splines engageable with splines on the hammer; and
    wherein the drill bit is mounted to the housing such that rotation and axial movement of the bit relative to the housing are prevented.

12. The drilling assembly of claim 1 wherein the cam comprises guide pins and the guide surface comprises a guide channel; and
    wherein the guide channel faces axially; and
    wherein the guide pins extend radially and comprise bearings, configured to roll on the guide channel.

13. The drilling assembly of claim 1, wherein the cam comprises guide pins and the guide surface comprises a guide channel, the guide pins slidably positionable in the guide channel.

14. The drilling assembly of claim 1, wherein the cam comprises a floating guide ring having a cam surface and the guide surface comprises a guide ring engageable, the guide ring having the guide surface thereon.

15. The drilling assembly of claim 1, wherein the cam is positioned about an end of the hammer.

16. The drilling assembly of claim 1, wherein the hammer comprises a bit adapter operatively connectable to the bit and wherein the guide surface is positioned about an end of the bit adapter.

17. The drilling assembly of claim 1, further comprising a universal joint operatively connectable to the motor and the shaft; and
    wherein the hammer is configured to move independently of weight on bit applied to the housing from a surface unit.

18. The drilling assembly of claim 1, wherein the hammer comprises a shaft adapter operatively connectable to the shaft and a bit adapter operatively connectable to the bit, the cam surface positionable about the shaft adapter and the guide surface positionable about the bit adapter.

19. The drilling assembly of claim 1, wherein the housing having splines engageable with splines on the bit.

20. A drilling assembly of a downhole drilling tool for drilling a wellbore penetrating a subterranean formation, the downhole drilling tool driven by surface equipment and comprising a drill string, a bottom hole assembly, and a drill bit, the drilling assembly comprising:
    a housing positionable about the bottom hole assembly;
    a hammer motor positionable in the housing and rotationally driven by fluid flow therethrough;
    a shaft operatively connectable to the hammer motor and rotatably thereby;
    a driver operatively connectable to the shaft, the driver comprising a cam rotatable with the shaft and a guide having a guide surface thereon, the cam engageable with the guide surface and axially movable thereabout during rotation thereof;
    a hammer operatively connectable to the driver and axially movable therewith, the hammer axially movable within the housing independently from axial movement of the housing, the hammer engageable with the bit to impart an impact thereto whereby the bit is hammered; and
    a fluid passage extending through the drill string, through the hammer, and through the bit, the fluid passage including a flow restriction positioned to restrict flow of fluid through the hammer and configured such that an axially-downward force is applied to the hammer by the fluid when fluid flows through the flow restriction;
wherein the flow restriction is a nozzle;
wherein the flow passage is configured to allow a total flow rate of drilling fluid to enter the drill string, and to allow a first portion of the total flow rate to flow through the hammer into the bit; and
wherein the fluid passage includes a bypass passage extending through the sidewall of the hammer and configured to allow a second portion of the total flow rate to contact a bearing disposed around the hammer, supporting the hammer in the housing.

21. The drilling assembly of claim 20, wherein the second portion of the total flow rate is from 5 to 15 percent of the total flow rate.

22. A drilling system for drilling a wellbore penetrating a subterranean formation, comprising:
a downhole tool comprising a bottom hole assembly, a drill string, and a drill bit deployable by a surface system; and
a drilling assembly, comprising:
a housing positionable about the bottom hole assembly;
a hammer motor positionable in the housing and rotationally driven by fluid flow therethrough;
a shaft operatively connectable to the hammer motor and rotatably thereby;
a driver operatively connectable to the shaft, the driver comprising a cam rotatable with the shaft and a fixed guide having a guide surface thereon, the cam engageable with the guide surface and axially movable thereabout during rotation thereof;
a hammer operatively connectable to the driver and axially movable therewith, the hammer axially movable within the housing independently from axial movement of the housing, the hammer engageable with the bit to impart an impact thereto whereby the bit is hammered; wherein the drill bit is threadably mounted to the housing, the threaded mounting preventing the bit from moving independently of the housing; and
a flow restriction coupled for movement with the hammer, the flow restriction receives at least a portion of the fluid flow and to generate an axially-downward fluid force against the hammer to drive the hammer downward;
wherein the flow restriction is axially movable relative to the drill bit.

23. The drilling system of claim 22, further comprising a fluid passage extending through the drillstring, through the bottom hole assembly, through the hammer, and through the bit, the fluid passage including a nozzle positioned to restrict flow of fluid through the hammer, the nozzle configured such that an axial force is applied to the hammer when fluid flows through the fluid passage.

24. The drilling system of claim 22, further comprising a downhole motor, the drilling assembly rotationally driven by the downhole motor.

25. A method of drilling a wellbore penetrating a subterranean formation, the method comprising:
deploying a downhole tool into the subterranean formation via a surface system, the downhole tool comprising a bottom hole assembly, a drill string, and a drill bit;
rotating a drilling assembly comprising a hammer motor, a shaft operatively connectable to the hammer motor, a driver operatively connectable to the shaft, and a hammer, the driver comprising a cam and a fixed guide having a guide surface thereon, the hammer operatively connectable to the driver and axially movable therewith;
rotating the cam with the shaft by passing a fluid through the hammer motor; and
hammering the bit with the hammer by engaging the guide surface with the cam such that the cam is axially moved about the guide surface during the rotating and the hammer is axially moved within a housing independently from axial movement of the housing;
wherein hammering the bit includes generating an axially-downward fluid force to drive the hammer downward by passing the fluid through a flow restriction that is coupled for movement with the hammer and is axially movable relative to the drill bit.

26. The method of claim 25, further comprising selectively increasing pressure in the drilling assembly by selectively restricting flow therethrough.

27. The method of claim 25, wherein the hammering comprises slidably positioning pins of the cam about a guide channel of the guide surface.

28. The method of claim 25, wherein the hammering comprises slidably engaging a cam surface of the cam along the guide surface.

29. The method of claim 25, further comprising passing a portion of the fluid through a rotor of the hammer motor.

30. The method of claim 25, wherein generating an axially-downward force to drive the hammer comprises selectively restricting the flow of fluid through the hammer.

* * * * *